(12) United States Patent
Ahlfeld et al.

(10) Patent No.: US 9,275,759 B2
(45) Date of Patent: Mar. 1, 2016

(54) MODULAR NUCLEAR FISSION REACTOR

(75) Inventors: Charles E. Ahlfeld, LaJolla, CA (US);
John Rogers Gilleland, Kirkland, WA (US); Roderick A. Hyde, Redmond, WA (US); Muriel Y. Ishikawa, Livermore, CA (US); David G. McAlees, Bellevue, WA (US); Nathan P. Myhrvold, Medina, WA (US); Charles Whitmer, North Bend, WA (US); Lowell L. Wood, Jr., Bellevue, WA (US); Ashok Odedra, Bellevue, WA (US)

(73) Assignee: TerraPower, LLC, Bellevue, WA (US)

( * ) Notice: Subject to any disclaimer, the term of this patent is extended or adjusted under 35 U.S.C. 154(b) by 1731 days.

(21) Appl. No.: 12/069,907

(22) Filed: Feb. 12, 2008

(65) Prior Publication Data

US 2008/0232535 A1    Sep. 25, 2008

Related U.S. Application Data

(63) Continuation-in-part of application No. 11/605,943, filed on Nov. 28, 2006, now abandoned, and a continuation-in-part of application No. 11/605,848, filed on Nov. 28, 2006, now Pat. No. 7,860,207, which is a continuation-in-part of application No. 11/605,933, filed on Nov. 28, 2006, now abandoned.

(51) Int. Cl.
*G21C 1/26* (2006.01)
*G21C 1/00* (2006.01)
*G21C 1/02* (2006.01)
*G21C 1/30* (2006.01)

(52) U.S. Cl.
CPC ......... *G21C 1/00* (2013.01); *G21C 1/026* (2013.01); *G21C 1/30* (2013.01); *Y02E 30/34* (2013.01)

(58) Field of Classification Search
USPC .......................................................... 376/260
See application file for complete search history.

(56) References Cited

U.S. PATENT DOCUMENTS

| | | | |
|---|---|---|---|
| 3,096,263 A | 7/1963 | Kingston et al. | |
| 3,147,191 A | 9/1964 | Crowther | |
| 3,437,847 A | 4/1969 | Raspet | |
| 3,535,562 A | 10/1970 | Byrd | |
| 3,601,638 A | 8/1971 | Busse | |
| 3,607,631 A | 9/1971 | Hobson et al. | |

(Continued)

FOREIGN PATENT DOCUMENTS

| | | |
|---|---|---|
| DE | 1539689 | 1/1970 |
| DE | 2142744 | 3/1973 |

(Continued)

OTHER PUBLICATIONS

Teller et al., Completely Automated Nuclear Reactor for Long-Term Operation, Jan. 1996.*

(Continued)

*Primary Examiner* — Jack W Keith
*Assistant Examiner* — Sean P Burke

(57) ABSTRACT

Illustrative embodiments provide modular nuclear fission deflagration wave reactors and methods for their operation. Illustrative embodiments and aspects include, without limitation, modular nuclear fission deflagration wave reactors, modular nuclear fission deflagration wave reactor modules, methods of operating a modular nuclear fission deflagration wave reactor, and the like.

11 Claims, 21 Drawing Sheets

(56) References Cited

U.S. PATENT DOCUMENTS

| | | | |
|---|---|---|---|
| 3,629,063 | A | 12/1971 | Houston |
| 3,668,070 | A | 6/1972 | Fiebelmann et al. |
| 3,732,427 | A | 5/1973 | Trudeau et al. |
| 3,854,524 | A | 12/1974 | Gregorie et al. |
| 3,960,655 | A | 6/1976 | Bohanan et al. |
| 4,072,559 | A | 2/1978 | Neidl et al. |
| 4,113,563 | A * | 9/1978 | Tobin .......................... 376/427 |
| 4,270,938 | A | 6/1981 | Schmidt et al. |
| T101,204 | I4 | 11/1981 | Hampel |
| 4,303,474 | A | 12/1981 | Baxi |
| 4,478,784 | A | 10/1984 | Burelbach |
| 4,508,677 | A * | 4/1985 | Craig et al. .................. 376/174 |
| 4,591,479 | A | 5/1986 | Weitzberg |
| 4,604,785 | A | 8/1986 | Eddens |
| 4,617,170 | A | 10/1986 | Suchy |
| 4,636,352 | A | 1/1987 | Boyle |
| 4,749,544 | A | 6/1988 | Crowther et al. |
| 4,764,339 | A * | 8/1988 | Lake et al. ................... 376/353 |
| 4,827,139 | A | 5/1989 | Wells et al. |
| 4,851,183 | A | 7/1989 | Hampel |
| 5,019,322 | A | 5/1991 | von Charzewski et al. |
| 5,039,475 | A | 8/1991 | Kennel et al. |
| 5,082,617 | A | 1/1992 | Walter et al. |
| 5,182,077 | A | 1/1993 | Feinroth |
| 5,202,084 | A | 4/1993 | Fennern et al. |
| 5,223,210 | A | 6/1993 | Hunsbedt et al. |
| 5,241,573 | A | 8/1993 | Thacker |
| 5,264,056 | A | 11/1993 | Lapides |
| 5,307,387 | A | 4/1994 | Nakajima et al. |
| 5,309,493 | A | 5/1994 | Kamimura et al. |
| 5,353,321 | A | 10/1994 | Rybnikov |
| 5,408,510 | A | 4/1995 | Ball et al. |
| 5,420,897 | A | 5/1995 | Kasai et al. |
| 5,493,592 | A | 2/1996 | Garzarolli et al. |
| 5,684,848 | A | 11/1997 | Gou et al. |
| 5,774,514 | A | 6/1998 | Rubbia |
| 6,120,706 | A | 9/2000 | Lessing et al. |
| 6,233,298 | B1 | 5/2001 | Bowman |
| 6,512,805 | B1 | 1/2003 | Takeda et al. |
| 6,768,781 | B1 | 7/2004 | Moriarty |
| 6,878,952 | B1 | 4/2005 | Ohsono et al. |
| 6,944,255 | B2 | 9/2005 | Hattori et al. |
| 2003/0174802 | A1 | 9/2003 | Hare |
| 2004/0047445 | A1 | 3/2004 | Delafoy et al. |
| 2004/0182088 | A1 | 9/2004 | Ghoshal et al. |
| 2005/0069075 | A1 | 3/2005 | D'Auvergne |
| 2006/0056572 | A1 | 3/2006 | Lecomte |
| 2006/0109944 | A1 | 5/2006 | Popa |
| 2006/0133972 | A1 | 6/2006 | Guetlhuber et al. |
| 2006/0171498 | A1 | 8/2006 | D'Auvergne |
| 2006/0227924 | A1 * | 10/2006 | Hallstadius et al. .......... 376/414 |
| 2007/0092053 | A1 | 4/2007 | Sato |
| 2008/0069289 | A1 | 3/2008 | Peterson |
| 2008/0123796 | A1 | 5/2008 | Hyde et al. |
| 2008/0232533 | A1 | 9/2008 | Blanovsky |
| 2009/0080587 | A1 | 3/2009 | Ahlfeld et al. |
| 2009/0080588 | A1 | 3/2009 | Ahlfeld et al. |
| 2009/0080592 | A1 | 3/2009 | Arsenlis et al. |

FOREIGN PATENT DOCUMENTS

| | | |
|---|---|---|
| GB | 1063696 | 3/1967 |
| JP | 10-115692 | 5/1998 |
| JP | 2002-071866 A | 3/2002 |
| JP | 2002-181976 A | 6/2002 |
| JP | 2005-527808 A | 9/2005 |
| JP | 2007-232429 | 9/2007 |
| WO | WO 2009/136971 A2 | 11/2009 |
| WO | WO 2009/139899 A1 | 11/2009 |

OTHER PUBLICATIONS

Hyde, Roderick; Ishikawa, Muriel; Myhrvold, Nathan; Nuckolls, John; Wood, Lowell; "Nuclear Fission Power for $21^{st}$ Century Needs: Enabling Technologies for Large-Scale, Low-Risk, Affordable Nuclear Electricity" [Abstract]; pp. 1.

U.S. Appl. No. 11/605,848, filed Nov. 28, 2006, Hyde et al.
U.S. Appl. No. 11/605,933, filed Nov. 28, 2006, Hyde et al.
Teller, Edward; Ishikawa, Muriel; Wood, Lowell; "Completely Automated Nuclear Reactors for Long-Term Operation"; "Frontiers in Physics Symposium"; bearing dates of Oct. 26-28, 1995 and Jan. 1996; pp. 1-13; Lawrence Livermore National Laboratory; Livermore, California.
Teller, Edward; Ishikawa, Muriel; Wood, Lowell; Hyde, Roderick; Nuckolls, John; "Completely Automated Nuclear Power Reactors for Long-Term Operation: III. Enabling Technology for Large-Scale, Low-Risk, Affordable Nuclear Electricity"; pp. 1-57; University of California Lawrence Livermore National Laboratory; Livermore, California.
Teller, Edward; Ishikawa, Muriel; Wood, Lowell; Hyde, Roderick; Nuckolls, John; "Completely Automated Nuclear Reactors for Long-Term Operation II: Toward a Concept-Level Point-Design of a High-Temperature, Gas-Cooled Central Power Station"; 1996 International Conference on Emerging Nuclear Energy Systems; bearing dates of Jun. 20, 1996 and Jun. 24-28, 1996; pp. 1-44; Lawrence Livermore National Laboratory; Livermore, California.
Teller, Edward; Wood, Lowell; Nuckolls, John; Ishikawa, Muriel; Hyde, Roderick; "Problem-Free Nuclear Power and Global Change"; $22^{nd}$ International Symposium on Planetary Emergencies; bearing dates of Aug. 15, 1997 and Aug. 20-23, 1997; pp. 1-10; Lawrence Livermore National Laboratory; Livermore, California.
Wood, Lowell; Hyde, Rod; Ishikawa, Muriel; "Novel Approaches to Nuclear Fission Power Generation: A Practical, *Manifestly* Safe Point-Design for World-Wide Civil Use in the $21^{st}$ Century"; LLNL P&AT/CGSR ad hoc session; bearing a date of Apr. 25, 2001; pp. 1-15.
Wood, Lowell; Ishikawa, Muriel; Hyde, Roderick; "Global Warming and Nuclear Power"; Ninth Summer Workshop Innovative Energy Systems and CO2 Stabilization Aspen Global Change Institute in Aspen, CO; bearing dates of Jul. 10, 1998 and Jul. 14-24, 1998; pp. 1-22; Lawrence Livermore National Laboratory; Livermore, California.
Teller, Edward; Ishikawa, Muriel; Wood, Lowell; "Completely Automated Nuclear Reactors for Long-Term Operation"; Frontiers in Physics Symposium, Joint American Physical Society and the America Association of Physics Teachers Texas meeting Oct. 26-28, 1995; Jan. 1996; Lubbock, Texas; pp. 1-15.
Wood, Lowell; Ishikawa, Muriel; Hyde, Roderick; "Global Warming and Nuclear Power"; 9th Summer Workshop, Innovative Energy Systems and CO2 Stabilization Jul. 14-24, 1998, Aspen Global Change Institute; Jul. 10, 1998; Aspen, Colorado; pp. 1-21.
PCT International Search Report; International App. No. PCT/US2007/024392; Oct. 7, 2008; pp. 1-4.
PCT International Search Report; International App. No. PCT/US2007/024445; Aug. 26, 2008; pp. 1-2.
PCT International Search Report; International App. No. PCT/US2007/024375; Oct. 7, 2008; pp. 1-4.
International Search Report; International App. No. PCT/US2009/00765; Oct. 13, 2009; pp. 1-2.
International Search Report; International App. No. PCT/US2009/00764; Oct. 13, 2009; pp. 1-2.
International Search Report; International App. No. PCT/US2009/00763; Oct. 5, 2009; pp. 1-2.
Teller, Edward. "Nuclear Energy for the Third Millenium"; International Conference on Environment and Nuclear Energy Oct. 27-29, 1997; bearing a date of Oct. 1997; 1-14; Livermore, California.
Akhiezer, A. I.; Khizhnyak, N. A.; Shulga, N. F.; Pilipenko, V. V.; and Davydov, L. N.; "Slow Nuclear Burning"; Problems of Atomic Science and Technology; 2001; pp. 272-275; vol. 6.
Atefi, B.; Driscoll, M. J.; and Lanning, D. D.; "An Evaluation of the Breed/Burn Fast Reactor Concept"; Massachusetts Institute of Technology, Department of Nuclear Engineering; Dec. 1979; pp. 1-295.
Feinberg, S. M.; "Discussion Comment"; Rec. of Proc. Session B-10 of the ICPUAE; Sep. 10, 1958; pp. 447-449; No. 2, vol. 9; Geneva, Switzerland.
Feoktistov, L. P.; "An Analysis of a Concept of a Physically Safe Reactor"; Preprint IAE-4605/4; Moscow: IAE; 1988; pp. 1-9; in Russian.

(56) References Cited

OTHER PUBLICATIONS

Feoktistov, L. P.; "Neutron-Fissioning Wave"; Dokl. Akad. Nauk SSSR; 1989; pp. 864-867; in Russian.

Fomin, S. P.; Mel'Nik, Yu. P.; Pilipenko, V. V.; and Shul'Ga, N. F.; "Study of Self-Organizing Regime of Nuclear Burning Wave in Fast Reactor"; Problems of Atomic Science and Technology; 2005; pp. 106-113, No. 6.

Ohoka, Y.; and Sekimoto, H.; "Application of Candle Burnup to Block-Type High Temperature Gas Cooled Reactor"; Nuclear Engineering and Design; 2004; pp. 15-23; vol. 229; Elsevier B. V.

Sekimoto, Hiroshi; "Application of Candle Burnup Strategy for Future Nuclear Energy Utilization"; Progress in Nuclear Energy; 2005; pp. 91-98; vol. 47; No. 1-4; Elsevier Ltd.; Great Britain.

Sekimoto, Hiroshi; "Fuel-Cycle of Candle Burnup with Depleted Uranium"; Proc. of ICAPP 2005; May 15-19, 2005; Seoul, Korea.

Sekimoto, Hiroshi; "Fuel-Cycle of Candle Burnup with Depleted Uranium"; Proc. of ICAPP 2006; Jun. 4-8, 2006, Reno, Nevada; pp. 1908-1914; American Nuclear Society; LaGrange Park, IL.

Sekimoto, Hiroshi and Ryu, Kouichi; "A New Reactor Burnup Concept 'Candle'"; Proc. of PHYSOR2000; May 7-11, 2000; pp. 1-9; Pittsburgh, PA.

Sekimoto, Hiroshi; Ryu, Kouichi; and Yoshimura, Yoshikane; "Candle: The New Burnup Strategy"; Nuclear Science and Engineering; 2001; pp. 306-317; vol. 139.

Sekimoto, Hiroshi and Tanaka, Kohtaro; "Candle Burnup for Different Cores"; Proc. of PHYSOR 2002: International Conference on the New Frontiers of Nuclear Technology: Reactor Physics, Safety and High-Performance Computing; Oct. 7-10, 2002; pp. 1-12; Seoul, Korea.

Sekimoto, Hiroshi; Toshinsky, V.; and Ryu, K.; "Natural Uranium Utilization without Enrichment and Reprocessing"; Proc. of Global 2001; Sep. 9-13, 2001; pp. 1-3; Paris, France.

Soentono, Soedyartomo; "Nuclear Power Development in Indonesia"; Proc. of Energy Future and the Nuclear Fuel Cycle in the Asia/Pacific Region, 19th Annual Conference Industrial Liaison Program; pp. 51-61; Mar. 12, 1997.

Toshinsky, Georgy I.; "LMFBR Operation in the Nuclear Cycle Without Fuel Reprocessing"; Proceedings of the International Topical Meeting on Advanced Reactors Safety (ARS '97); Jun. 1-5, 1997; pp. 39-44; vol. I; Orlando, FL.

Toshinsky, Vladimir G.; Sekimoto, Hiroshi; and Toshinsky, Georgy I.; "Multiobjective Fuel Management Optimization for Self-Fuel-Providing LMFBR Using Genetic Algorithms"; Annals of Nuclear Energy; 1999; pp. 783-802; vol. 26; Elsevier Science Ltd.

Van Dam, Hugo; "The Self-Stabilizing Criticality Wave Reactor"; Proc. of the Tenth International Conference on Emerging Nuclear Energy Systems (ICENES 2000); 2000; pp. 009.1-009.10; Petten, Netherlands.

Yarsky, P.; Driscoll, M. J.; and Hejzlar, P.; "Integrated Design of a Breed and Burn Gas-Cooled Fast Reactor Core"; The MIT Center for Advanced Nuclear Energy Systems (CANES); Document No. MIT-ANP-TR-107; Sep. 2005; pp. 1-253.

PCT International Search Report; International App. No. PCT/US2009/04512; Dec. 7, 2009; pp. 1-2.

PCT International Search Report; International App. No. PCT/US09/03028; Jul. 7, 2009; pp. 1-2.

Chen et al.; "Transverse buckling effects on solitary burn-up waves"; Annals of Nuclear Energy; bearing dates of Dec. 24, 2004, Jan. 5, 2005, and Apr. 29, 2005; pp. 1377-1390; vol. 32; Elsevier Ltd.

St. Clair, Richard; Summary of MIT-Tokyo Tech Symposium on Innovative Nuclear Energy Systems; Nov. 2-4, 2005; pp. 1-17; MIT Department of Nuclear Science and Engineering; Cambridge, MA.

European Search Report; App. No. 07872643; Jun. 6, 2011; pp. 1-13.

Ohoka, Yasunori; Watanabe, Takashi; and Sekimoto, Hiroshi; "Simulation Study on Candle Burnup Applied to Block-Type High Temperature Gas Cooled Reactor"; Progress in Nuclear Energy; 2005; pp. 292-299; vol. 47, No. 1-4; Elsevier, Ltd.; Great Britain.

European Search Report; App. No. 09742958.3; Mar. 29, 2011; pp. 1-4.

Sekimoto, Hiroshi, Miyashita, Seiichi; "Startup of 'Candle' burnup in fast reactor from enriched uranium core"; Energy Conversion and Management; May 22, 2006; p. 2772-2780; vol. 47; Elsevier Ltd.

European Patent Office Search Report; App. No. EP 07 872 643.7; Feb. 3, 2012; pp. 1-3.

European Office Action; European App. No. EP 09 742 958.3; Nov. 15, 2011; pp. 1-3.

"Accelerator-Driven Systems (ADS) and Fast Reactors (FR) in Advanced Nuclear Fuel Cycles, A Comparative Study"; 2002; pp. 43-46; Nuclear Energy Agency Organisation for Economic Co-Operation and Development.

Code of Federal Regulations, 10 CFR Parts 0-50; Jan. 1, 1994; pp. 624 and 724-726; Office of the Federal Register, National Archives and Records Administration.

Hyde et al.; "Nuclear Fission Power for $21^{st}$ Century Needs: Enabling Technologies for Large-Scale, Low-Risk, Affordable Nuclear Electricity"; Progress in Nuclear Energy; 2007; pp. 82-91; vol. 50; Elsevier Ltd.

Chinese Patent Office; First Office Action; App. No. 2007/80049972.8 (based on PCT Patent Application No. PCT/US07/024375); Feb. 1, 2012; pp. 1-4.

Chinese Patent Office; First Office Action; App. No. 2007/80049941.2; Jan. 29, 2012; pp. 1-6; no translation available.

(Author unknown); "CEFR"; bearing a date of Oct. 1, 1998; pp. 1-1 through 1-8; no translation available.

European Patent Office Search Report; App. No. EP 09 74 6986; Feb. 22, 2012; pp. 1-7.

European Patent Office; Supplementary European Search Report; App. No. EP 07 87 3828; Jun. 26, 2012; pp. 1-3.

Russian Federal Service for Intellectual Property; Office Action; Russian Application No. 2010147880; Oct. 17, 2012 ; 19 pages; (machine translation to English provided, 12 pages).

"Accelerator-driven Systems (ADS) and Fast Reactors (FR) in Advanced Nuclear Fuel Cycles: A Comparative Study"; Nuclear Energy Agency Organisation for Economic Co-Operation and Development; May 2, 2002 (as provided by examiner); pp. 43-46 (6 pages total); OECD Publications, Paris Cedex, France.

Teller et al; "Completely Automated Nuclear Power Reactors for Long-Term Operation: III. Enabling Technology for Large-Scale, Low Risk, Affordable Nuclear Electricity"; Lawrence Livermore National Laboratory; Nov. 30, 2003; pp. 1-59 (61 pages total); Preprint UCRL-JRNL-122708.

Chinese State Intellectual Property Office; Notification of the First Office Action; App. No. 200980112650.2; Jan. 30, 2013; pp. 1-5 (no English Translation Provided).

Chinese Patent Office; Second Office Action; Patent App. No. 200780049972.8; Dec. 31, 2012; pp. 1-6 (no translation provided).

Chinese Patent Office; Office Action; Patent App. No. 200780049941.2; Dec. 28, 2012; pp. 1-8 (no translation provided).

Chinese Patent Office; Second Office Action; Patent App. No. 200780049881.4; Dec. 28, 2012; pp. 1-4 (no translation provided).

Japanese Patent Office; Office Action; Patent App. No. 2009-539290; Jan. 8, 2013; pp. 1-6 (no translation provided).

Japanese Patent Office; Office Action; Patent App. No. 2009-539275; Jan. 8, 2013; pp. 1-7 (no translation provided).

Japanese Patent Office; Office Action; Patent App. No. 2009-539277; Jan. 8, 2013; pp. 1-4 (no translation provided).

Wang et al.; "Trial-manufacture of Cladding Materials of Core Subassemblies in China Experimental Fast Reactor"; Atomic Energy Science and Technology; Jul. 2003; pp. 73-76; vol. 37, Suppl. (no translation provided).

Xu et al.; "China Experimental Fast Reactor"; China Institute of Atomic Energy, Beijing; bearing a date of 1995; pp. 53-59; China Academic Journal Electronic Publishing House (no translation provided).

Russian Office Action; App. No. 2010136176/07(051427); dated Jul. 9, 2012; pp. 1-8 (3 pages of machine translation).

(56) References Cited

OTHER PUBLICATIONS

Emelyanov, I. Y. et al; "Design of Nuclear Reactors"; bearing a date of 1982; pp. 194-196; Energoatomizdat; Moscow (NPL not provided to Applicant and not included with Supplemental IDS).

Japanese Patent Office; The First Office Action (Notice of Reason for Refusal); App. No. 2010-546768 (based on PCT Patent Application No. PCT/US2009/000763); Jun. 18, 2013; pp. 1-5 (machine translation provided, 8 pages)

European Patent Office; European Search Report; Application No. EP 09 80 6943; Dec. 21, 2012; pp. 1-3.

European Patent Office; European Search Report; Application No. EP 07 87 3851; Dec. 21, 2012; pp. 1-4.

Chinese Patent Office First Office Action (with attachment); App. No. 2007/80049881.4; Dec. 29, 2011; 15 pages (including attachment); no translation available.

Emelyanov, I. Y. et al.; "Construction of Nuclear Reactors: Textbook for Schools"; bearing a date of 1982; 2 pages; Energoizdat; Moscow, Russia (machine translation to English provided, 1 page).

Samoilov, A. G. et al.; "Nuclear Reactor Fuel Element"; bearing a date of 1996; 10 pages; Energoatomizdat; Moscow, Russia; (machine translation to English provided, 10 pages).

Wood, Lowell et al.; "Novel Approaches to Nuclear Fission Power Generation: A Practical *Manifestly* Safe Point-Design for World-Wide Civil Use in the $21^{st}$ Century"; Discussion at LLNL P&AT/CGSR ad hoc session; Apr. 25, 2001; 15 pages.

European Patent Office; Communication Pursuant to Article 94(3) EPC; Application No. 09 746 986.0; Jan. 31, 2013; pp. 1-5.

European Patent Office, Summons to attend oral proceedings pursuant to Rule 115(1) EPC; App. No. 07872643.7; Feb. 21, 2013; pp. 1-4.

\* cited by examiner

MODULAR NUCLEAR FISSION REACTOR

CROSS-REFERENCE TO RELATED APPLICATIONS

The present application is related to and claims the benefit of the earliest available effective filing date from the following listed applications (the "Related Application") (e.g., claims earliest available priority dates for other than provisional patent applications or claims benefits under 35 USC §119(e) for provisional patent applications, for any and all parent, grandparent, great-grandparent, etc. applications of the Related Application).

RELATED APPLICATIONS

For purposes of the USPTO extra-statutory requirements, the present application constitutes a continuation-in-part of U.S. patent application Ser. No. 11/605,943, entitled AUTOMATED NUCLEAR POWER REACTOR FOR LONG-TERM OPERATION, naming RODERICK A. HYDE, MURIEL Y. ISHIKAWA, NATHAN P. MYHRVOLD, AND LOWELL L. WOOD, JR. as inventors, filed 28 Nov. 2006, which is currently co-pending, or is an application of which a currently co-pending application is entitled to the benefit of the filing date.

For purposes of the USPTO extra-statutory requirements, the present application constitutes a continuation-in-part of U.S. Pat. No. 7,860,207, entitled METHOD AND SYSTEM FOR PROVIDING FUEL IN A NUCLEAR REACTOR, naming RODERICK A. HYDE, MURIEL Y. ISHIKAWA, NATHAN P. MYHRVOLD, AND LOWELL L. WOOD, JR. as inventors, granted 28 Dec. 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/605,933, entitled CONTROLLABLE LONG TERM OPERATION OF A NUCLEAR REACTOR, naming RODERICK A. HYDE, MURIEL Y. ISHIKAWA, NATHAN P. MYHRVOLD, AND LOWELL L. WOOD, JR. as inventors, filed 28 Nov. 2006, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent application as set forth above, but expressly points out that such designations are not to be construed in any way as any type of commentary and/or admission as to whether or not the present application contains any new matter in addition to the matter of its parent application.

All subject matter of the Related Application and of any and all parent, grandparent, great-grandparent, etc. applications of the Related Applications is incorporated herein by reference to the extent such subject matter is not inconsistent herewith.

BACKGROUND

The present application relates to nuclear fission reactors, and systems, applications, and apparatuses related thereto.

SUMMARY

Illustrative embodiments provide modular nuclear fission deflagration wave reactors and methods for their operation. Illustrative embodiments and aspects include, without limitation, modular nuclear fission deflagration wave reactors, modular nuclear fission deflagration wave reactor modules, methods of operating a modular nuclear fission deflagration wave reactor, and the like.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1A:
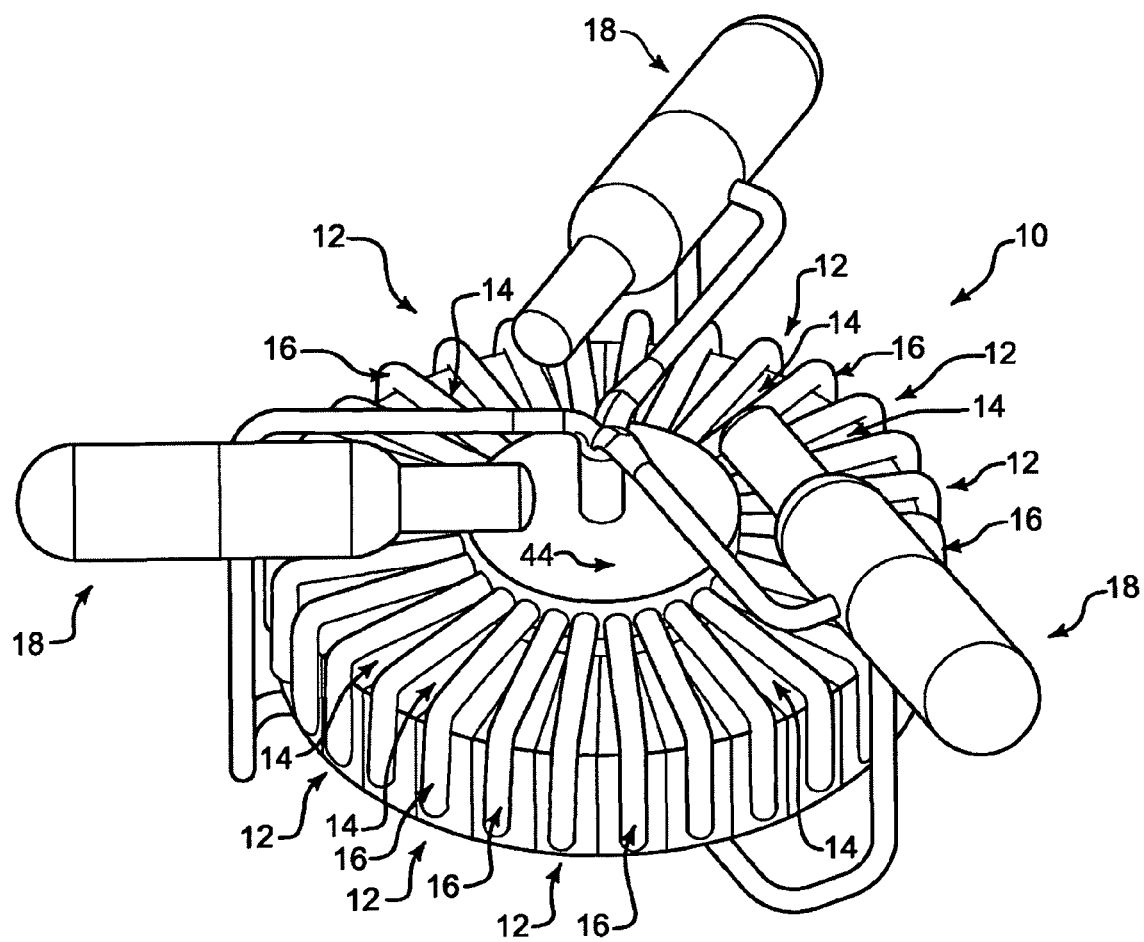
FIG. 1A is a perspective view in schematic form of an illustrative modular nuclear fission deflagration wave reactor.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

By way of overview, illustrative embodiments provide modular nuclear fission deflagration wave reactors and methods for their operation. Illustrative embodiments and aspects include, without limitation, modular nuclear fission deflagration wave reactors, modular nuclear fission deflagration wave reactor modules, methods of operating a modular nuclear fission deflagration wave reactor, and the like.

Still by way of overview and referring to FIG. 1A, an illustrative modular nuclear fission deflagration wave reactor 10 will be discussed by way of illustration and not limitation. The illustrative modular nuclear fission deflagration wave reactor 10 suitably includes nuclear fission deflagration wave reactor modules 12. Each nuclear fission deflagration wave reactor module 12 suitably includes a nuclear fission deflagration wave reactor core 14 and a reactor coolant system 16. Each nuclear fission deflagration wave reactor module 12 is operatively coupled in fluid communication to at least one heat sink 18 via its reactor coolant system 16. That is, each of the nuclear fission deflagration wave reactor modules 12 suitably can be considered a complete, stand-alone nuclear fission deflagration wave reactor by itself. Any nuclear fission deflagration wave reactor module 12 is neutronically coupled to at least one adjacent nuclear fission deflagration wave reactor module 12. Thus, adjacent nuclear fission deflagration wave reactor modules 12 can be neutronically integrated yet they are physically separate from each other.

While many embodiments of the modular nuclear fission deflagration wave reactor 10 are contemplated, a common feature among many contemplated embodiments of the modular nuclear fission deflagration wave reactor 10 is neutronically coupling of adjacent nuclear fission deflagration wave reactor modules 12 via origination of a nuclear fission deflagration wave, or "burnfront". In order to provide an understanding of illustrative modular nuclear fission deflagration wave reactors 10, illustrative core nucleonics, given by way of non-limiting example, will be set forth first. Such details are included in U.S. patent application Ser. No. 11/605,943, entitled AUTOMATED NUCLEAR POWER REACTOR FOR LONG-TERM OPERATION, naming RODERICK A. HYDE, MURIEL Y. ISHIKAWA, NATHAN P. MYHRVOLD, AND LOWELL L. WOOD, JR. as inventors, filed 28 Nov. 2006, U.S. Pat. No. 7,860,207, entitled METHOD AND SYSTEM FOR PROVIDING FUEL IN A NUCLEAR REACTOR, naming RODERICK A. HYDE, MURIEL Y. ISHIKAWA, NATHAN P. MYHRVOLD, AND LOWELL L. WOOD, JR. as inventors, granted 28 Dec. 2010, and U.S. patent application Ser. No. 11/605,933, entitled CONTROLLABLE LONG TERM OPERATION OF A NUCLEAR REACTOR, naming RODERICK A. HYDE, MURIEL Y. ISHIKAWA, NATHAN P. MYHRVOLD, AND LOWELL L. WOOD, JR. as inventors, filed 28 Nov. 2006, the entire contents of which are hereby incorporated by reference. Then, details will be set forth regarding several illustrative embodiments and aspects of the modular nuclear fission deflagration wave reactor 10.

Considerations

Before discussing details of the modular nuclear fission deflagration wave reactor 10, some considerations behind embodiments of the modular nuclear fission deflagration wave reactor 10 will be given by way of overview but are not to be interpreted as limitations. Some embodiments of the modular nuclear fission deflagration wave reactor 10 address many of the considerations discussed below. On the other hand, some other embodiments of the modular nuclear fission deflagration wave reactor 10 may address one, or a select few of these considerations, and need not accommodate all of the considerations discussed below. Portions of the following discussion include information excerpted from a paper entitled "Completely Automated Nuclear Power Reactors For Long-Term Operation: III. Enabling Technology For Large-Scale, Low-Risk, Affordable Nuclear Electricity" by Edward Teller, Muriel Ishikawa, Lowell Wood, Roderick Hyde, and John Nuckolls, presented at the July 2003 Workshop of the Aspen Global Change Institute, University of California Lawrence Livermore National Laboratory publication UCRL-JRNL-122708 (2003) (This paper was prepared for submittal to *Energy, The International Journal,* 30 Nov. 2003), the entire contents of which are hereby incorporated by reference.

Certain of the nuclear fission fuels envisioned for use in embodiments of the modular nuclear fission deflagration wave reactor 10 are typically widely available, such as without limitation uranium (natural, depleted, or enriched), thorium, plutonium, or even previously-burned nuclear fission fuel assemblies. Other, less widely available nuclear fission fuels, such as without limitation other actinide elements or isotopes thereof may be used in embodiments of the modular nuclear fission deflagration wave reactor 10. While some embodiments of the modular nuclear fission deflagration wave reactor 10 contemplate long-term operation at full power on the order of around ⅓ century to around ½ century or longer, an aspect of some embodiments of the modular nuclear fission deflagration wave reactor 10 does not contemplate nuclear refueling (but instead contemplate burial in-place at end-of-life) while some aspects of embodiments of the modular nuclear fission deflagration wave reactor 10 contemplate nuclear refueling—with some nuclear refueling occurring during shutdown and some nuclear refueling occurring during operation at power. It is also contemplated that nuclear fission fuel reprocessing may be avoided in some cases, thereby mitigating possibilities for diversion to military uses and other issues.

Other considerations that may affect choices for some embodiments of modular nuclear fission deflagration wave reactor 10 include disposing in a safe manner long-lived radioactivity generated in the course of operation. It is envisioned that the modular nuclear fission deflagration wave reactor 10 may be able to mitigate damage due to operator error, casualties such as a loss of coolant accident (LOCA), or the like. In some aspects decommissioning may be effected in low-risk and inexpensive manner.

For example, some embodiments of the modular nuclear fission deflagration wave reactor 10 may entail underground siting, thereby addressing large, abrupt releases and small, steady-state releases of radioactivity into the biosphere. Some embodiments of the modular nuclear fission deflagration wave reactor 10 may entail minimizing operator controls, thereby automating those embodiments as much as practicable. In some embodiments, a life-cycle-oriented design is contemplated, wherein those embodiments of the modular nuclear fission deflagration wave reactor 10 can operate from startup to shutdown at end-of-life. In some life-cycle oriented designs, the embodiments may operate in a substantially fully-automatic manner. Embodiments of the modular nuclear fission deflagration wave reactor 10 lend themselves to modularized construction. Finally, some embodiments of the modular nuclear fission deflagration wave reactor 10 may be designed according to high power density.

Some features of various embodiments of the modular nuclear fission deflagration wave reactor 10 result from some of the above considerations. For example, simultaneously accommodating desires to achieve ⅓-½ century (or longer) of operations at full power without nuclear refueling and to avoid nuclear fission fuel reprocessing may entail use of a fast neutron spectrum. As another example, in some embodiments a negative temperature coefficient of reactivity ($\alpha_T$) is engineered-in to the modular nuclear fission deflagration wave reactor 10, such as via negative feedback on local reactivity implemented with strong absorbers of fast neutrons. As a further example, in some embodiments of the modular nuclear fission deflagration wave reactor 10 a distributed thermostat enables a propagating nuclear fission deflagration wave mode of nuclear fission fuel burn. This mode simultaneously permits a high average burn-up of non-enriched actinide fuels, such as natural uranium or thorium, and use of a comparatively small "nuclear fission igniter" region of moderate isotopic enrichment of nuclear fissionable materials in the core's fuel charge. As another example, in some embodiments of the modular nuclear fission deflagration wave reactor 10, multiple redundancy is provided in primary and secondary core cooling.

Overview of Core Nucleonics

An overview of (i) the nuclear fission deflagration wave reactor core 14 and its nucleonics and (ii) propagation of a nuclear fission deflagration wave now will be set forth.

Given by way of overview and in general terms, structural components of the nuclear fission deflagration wave reactor core 14 may be made of tantalum (Ta), tungsten (W), rhenium (Re), or carbon composite, ceramics, or the like. These materials are suitable because of the high temperatures at which the nuclear fission deflagration wave reactor core 14 operates, and because of their creep resistance over the envisioned lifetime of full power operation, mechanical workability, and corrosion resistance. Structural components can be made from single materials, or from combinations of materials (e.g., coatings, alloys, multilayers, composites, and the like). In some embodiments, the nuclear fission deflagration wave reactor core 14 operates at sufficiently lower temperatures so that other materials, such as aluminum (Al), steel, titanium (Ti) or the like can be used, alone or in combinations, for structural components.

The nuclear fission deflagration wave reactor core 14 suitably can include a nuclear fission igniter and a larger nuclear fission deflagration burn-wave-propagating region. The nuclear fission deflagration burn-wave-propagating region suitably contains thorium or uranium fuel, and functions on the general principle of fast neutron spectrum fission breeding. In some embodiments, uniform temperature throughout the nuclear fission deflagration wave reactor core 14 is maintained by thermostating modules which regulate local neutron flux and thereby control local power production.

The nuclear fission deflagration wave reactor core 14 suitably is a breeder for reasons of efficient nuclear fission fuel utilization and of minimization of requirements for isotopic enrichment. Further, and referring now to FIGS. 1B and 1C, the nuclear fission deflagration wave reactor core 14 suitably utilizes a fast neutron spectrum because the high absorption cross-section of fission products for thermal neutrons typically does not permit utilization of more than about 1% of thorium or of the more abundant uranium isotope, $^{238}U$, in uranium-fueled embodiments, without removal of fission products.

Figure 1B:
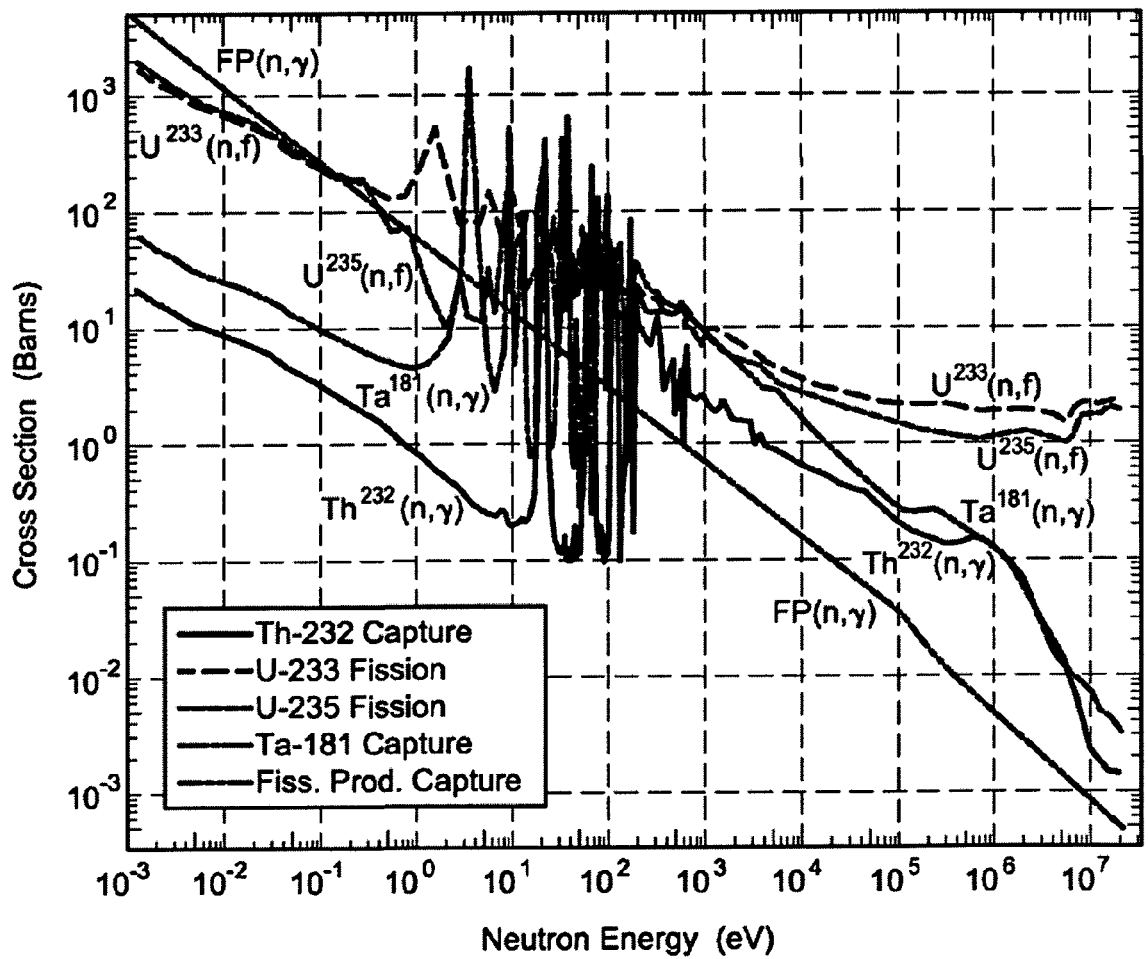
FIGS. 1B and 1C plot cross-section versus neutron energy.

In FIG. 1B, cross-sections for the dominant neutron-driven nuclear reactions of interest for the $^{232}Th$-fueled embodiments are plotted over the neutron energy range $10^{-3}$-$10^7$ eV. It can be seen that losses to radiative capture on fission product nuclei dominate neutron economies at near-thermal (~0.1 eV) energies, but are comparatively negligible above the resonance capture region (between ~3-300 eV). Thus, operating with a fast neutron spectrum when attempting to realize a high-gain fertile-to-fissile breeder can help to preclude fuel recycling (that is, periodic or continuous removal of fission products). The radiative capture cross-sections for fission products shown are those for intermediate-Z nuclei resulting from fast neutron-induced fission that have undergone subsequent beta-decay to negligible extents. Those in the central portions of the burn-waves of embodiments of the nuclear fission deflagration wave reactor core 14 will have undergone some decay and thus will have somewhat higher neutron avidity. However, parameter studies have indicated that core fuel-burning results may be insensitive to the precise degree of such decay.

Figure 1C:
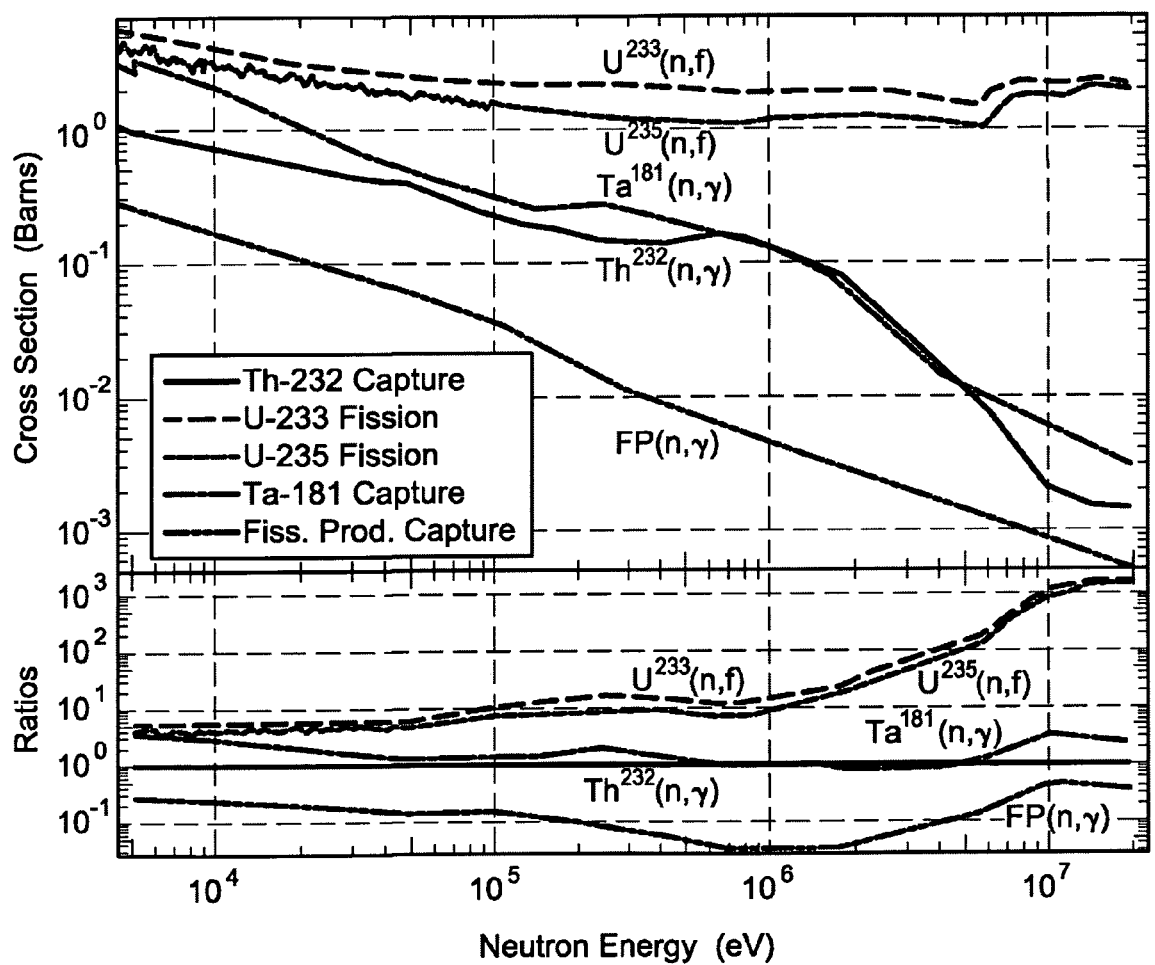

In FIG. 1C, cross-sections for the dominant neutron-driven nuclear reactions of primary interest for the $^{232}Th$-fueled embodiments are plotted over the most interesting portion of the neutron energy range, between $>10^4$ and $<10^{6.5}$ eV, in the upper portion of FIG. 1C. The neutron spectrum of embodiments of the nuclear fission deflagration wave reactor core 14 peaks in the $\geq 10^5$ eV neutron energy region. The lower portion of FIG. 1C contains the ratio of these cross-sections vs. neutron energy to the cross-section for neutron radiative capture on $^{232}Th$, the fertile-to-fissile breeding step (as the resulting $^{233}Th$ swiftly beta-decays to $^{233}Pa$, which then relatively slowly beta-decays to $^{233}U$, analogously to the $^{239}U$-$^{239}Np$-$^{239}Pu$ beta decay-chain upon neutron capture by $^{238}U$).

It can be seen that losses to radiative capture on fission products can be comparatively negligible over the neutron energy range of interest, and furthermore that atom-fractions of a few tens of percent of high-performance structural material, such as Ta, will impose tolerable loads on the neutron economy in the nuclear fission deflagration wave reactor core 14. These data also suggest that core-averaged fuel burn-up in excess of 50% can be realizable, and that fission product-to-fissile atom-ratios behind the nuclear fission deflagration wave when reactivity is finally driven negative by fission-product accumulation will be approximately 10:1.

Origination and Propagation of Nuclear Fission Deflagration Wave Burnfront

An illustrative nuclear fission deflagration wave within the nuclear fission deflagration wave reactor core 14 will now be explained. Propagation of deflagration burning-waves through combustible materials can release power at predictable levels. Moreover, if the material configuration has the requisite time-invariant features, the ensuing power production may be at a steady level. Finally, if deflagration wave propagation-speed may be externally modulated in a practical manner, the energy release-rate and thus power production may be controlled as desired.

Sustained nuclear fission deflagration waves are rare in nature, due to disassembly of initial nuclear fission fuel configuration as a hydrodynamic consequence of energy release during the earliest phases of wave propagation, in the absence of some control.

However, in embodiments of the nuclear fission deflagration wave reactor core 14 a nuclear fission deflagration wave can be initiated and propagated in a sub-sonic manner in fissionable fuel whose pressure is substantially independent of its temperature, so that its hydrodynamics is substantially 'clamped'. The nuclear fission deflagration wave's propagation speed within the nuclear fission deflagration wave reactor core 14 can be controlled in a manner conducive to large-scale power generation, such as in an electricity-producing reactor system like embodiments of the modular nuclear fission deflagration wave reactor 10.

Nucleonics of the nuclear fission deflagration wave are explained below. Inducing nuclear fission of selected isotopes of the actinide elements—the fissile ones—by capture of neutrons of any energy permits the release of nuclear binding energy at any material temperature, including arbitrarily low ones. The neutrons that are captured by the fissile actinide element may be provided by the nuclear fission igniter.

Release of more than a single neutron per neutron captured, on the average, by nuclear fission of substantially any actinide isotope can provide opportunity for a diverging neutron-mediated nuclear-fission chain reaction in such materials. Release of more than two neutrons for every neutron which is captured (over certain neutron-energy ranges, on the average) by nuclear fission by some actinide isotopes may permit first converting an atom of a non-fissile isotope to a fissile one (via neutron capture and subsequent beta-decay) by an initial neutron capture, and then of neutron-fissioning the nucleus of the newly-created fissile isotope in the course of a second neutron capture.

Most really high-Z (Z≥90) nuclear species can be combusted if, on the average, one neutron from a given nuclear fission event can be radiatively captured on a non-fissile-but-'fertile' nucleus which will then convert (such as via beta-decay) into a fissile nucleus and a second neutron from the same fission event can be captured on a fissile nucleus and, thereby, induce fission. In particular, if either of these arrangements is steady-state, then sufficient conditions for propagating a nuclear fission deflagration wave in the given material can be satisfied.

Due to beta-decay in the process of converting a fertile nucleus to a fissile nucleus, the characteristic speed of wave advance is of the order of the ratio of the distance traveled by a neutron from its fission-birth to its radiative capture on a fertile nucleus (that is, a mean free path) to the half-life of the (longest-lived nucleus in the chain of) beta-decay leading from the fertile nucleus to the fissile one. Such a characteristic fission neutron-transport distance in normal-density actinides is approximately 10 cm and the beta-decay half-life is $10^5$-$10^6$ seconds for most cases of interest. Accordingly for some designs, the characteristic wave-speed is $10^{-4}$-$10^{-7}$ cm sec$^{-1}$, or approximately $10^{-13}$-$10^{-14}$ of that of a typical nuclear detonation wave. Such a relatively slow speed-of-advance indicates that the wave can be characterized as a deflagration wave, rather than a detonation wave.

If the deflagration wave attempts to accelerate, its leading-edge counters ever-more-pure fertile material (which is quite lossy in a neutronic sense), for the concentration of fissile nuclei well ahead of the center of the wave becomes exponentially low. Thus the wave's leading-edge (referred to herein as a "burnfront") stalls or slows. Conversely, if the wave slows, the local concentration of fissile nuclei arising from continuing beta-decay increases, the local rates of fission and neutron production rise, and the wave's leading-edge, that is the burnfront, accelerates.

Finally, if the heat associated with nuclear fission is removed sufficiently rapidly from all portions of the configuration of initially fertile matter in which the wave is propagating, the propagation may take place at an arbitrarily low material temperature—although the temperatures of both the neutrons and the fissioning nuclei may be around 1 MeV.

Such conditions for initiating and propagating a nuclear fission deflagration wave can be realized with readily available materials. While fissile isotopes of actinide elements are rare terrestrially, both absolutely and relative to fertile isotopes of these elements, fissile isotopes can be concentrated, enriched and synthesized. The use of both naturally-occurring and man-made ones, such as $^{235}$U and $^{239}$Pu, respectively, in initiating and propagating nuclear fission detonation waves is well-known.

Consideration of pertinent neutron cross-sections (shown in FIGS. 1B and 1C) suggests that a nuclear fission deflagration wave can burn a large fraction of a core of naturally-occurring actinides, such as $^{232}$Th or $^{238}$U, if the neutron spectrum in the wave is a 'hard' or 'fast' one. That is, if the neutrons which carry the chain reaction in the wave have energies which are not very small compared to the approximately 1 MeV at which they are evaporated from nascent fission fragments, then relatively large losses to the space-time-local neutron economy can be avoided when the local mass-fraction of fission products becomes comparable to that of the fertile material (recalling that a single mole of fissile material fission-converts to two moles of fission-product nuclei). Even neutronic losses to typical neutron-reactor structural materials, such as Ta, which has desirable high-temperature properties, may become substantial at neutron energies ≤0.1 MeV.

Another consideration is the (comparatively small) variation with incident neutron energy of the neutron multiplicity of fission, ν, and the fraction of all neutron capture events which result in fission (rather than merely γ-ray emission). The algebraic sign of the function $\alpha(\nu-2)$ constitutes a condition for the feasibility of nuclear fission deflagration wave propagation in fertile material compared with the overall fissile isotopic mass budget, in the absence of neutron leakage from the core or parasitic absorptions (such as on fission products) within its body, for each of the fissile isotopes of the nuclear fission deflagration wave reactor core 14. The algebraic sign is generally positive for all fissile isotopes of interest, from fission neutron-energies of approximately 1 MeV down into the resonance capture region.

The quantity $\alpha(\nu-2)/\nu$ upper-bounds the fraction of total fission-born neutrons which may be lost to leakage, parasitic absorption, or geometric divergence during deflagration wave propagation. It is noted that this fraction is 0.15-0.30 for the major fissile isotopes over the range of neutron energies which prevails in all effectively unmoderated actinide isotopic configurations of practical interest (approximately 0.1-1.5 MeV). In contrast to the situation prevailing for neutrons of (epi-) thermal energy (see FIG. 1C), in which the parasitic losses due to fission products dominate those of fertile-to-fissile conversion by 1-1.5 decimal orders-of-magnitude, fissile element generation by capture on fertile isotopes is favored over fission-product capture by 0.7-1.5 orders-of-magnitude over the neutron energy range 0.1-1.5 MeV. The former suggests that fertile-to-fissile conversion will be feasible only to the extent of 1.5-5% percent at-or-near thermal neutron energies, while the latter indicates that conversions in excess of 50% may be expected for near-fission energy neutron spectra.

In considering conditions for propagation of a nuclear fission deflagration wave, in some approaches neutron leakage may be effectively ignored for very large, "self-reflected" actinide configurations. Referring to FIG. 1C and analytic estimates of the extent of neutron moderation-by-scattering entirely on actinide nuclei, it will be appreciated that deflagration wave propagation can be established in sufficiently large configurations of the two types of actinides that are relatively abundant terrestrially: $^{232}$Th and $^{238}$U, the exclusive and the principal (that is, longest-lived) isotopic components of naturally-occurring thorium and uranium, respectively.

Specifically, transport of fission neutrons in these actinide isotopes will likely result in either capture on a fertile isotopic nucleus or fission of a fissile one before neutron energy has decreased significantly below 0.1 MeV (and thereupon becomes susceptible with non-negligible likelihood to capture on a fission-product nucleus). Referring to FIG. 1B, it will be appreciated that fission product nuclei concentrations can significantly exceed fertile ones and fissile nuclear concentrations may be an order-of-magnitude less than the lesser of fission-product or fertile ones while remaining quantitatively substantially reliable. Consideration of pertinent neutron scattering cross-sections suggests that right circular cylindrical configurations of actinides which are sufficiently extensive to be effectively infinitely thick—that is, self-reflecting—to fission neutrons in their radial dimension will have density-radius products >>200 gm/cm$^2$—that is, they will have radii >>10-20 cm of solid-density $^{238}$U-$^{232}$Th.

The breeding-and-burning wave provides sufficient excess neutrons to breed new fissile material 1-2 mean-free-paths into the yet-unburned fuel, effectively replacing the fissile fuel burnt in the wave. The 'ash' behind the burn-wave's peak is substantially 'neutronically neutral', since the neutronic reactivity of its fissile fraction is just balanced by the parasitic absorptions of structure and fission product inventories on top of leakage. If the fissile atom inventory in the wave's center and just in advance of it is time-stationary as the wave propagates, then it is doing so stably; if less, then the wave is 'dying', while if more, the wave may be said to be 'accelerating.'

Thus, a nuclear fission deflagration wave may be propagated and maintained in substantially steady-state conditions for long time intervals in configurations of naturally-occurring actinide isotopes.

The above discussion has considered, by way of non-limiting example, circular cylinders of natural uranium or thorium metal of less than a meter or so diameter—and that may be substantially smaller in diameter if efficient neutron reflectors are employed—that may stably propagate nuclear fission deflagration waves for arbitrarily great axial distances. However, propagation of nuclear fission deflagration waves is not to be construed to be limited to circular cylinders, to symmetric geometries, or to singly-connected geometries. To that end, additional embodiments of alternate geometries of nuclear fission deflagration wave reactor cores are described in U.S. patent application Ser. No. 11/605,943, entitled AUTOMATED NUCLEAR POWER REACTOR FOR LONG-TERM OPERATION, naming RODERICK A. HYDE, MURIEL Y. ISHIKAWA, NATHAN P. MYHRVOLD, AND LOWELL L. WOOD, JR. as inventors, filed 28 Nov. 2006, the entire contents of which are hereby incorporated by reference.

Propagation of a nuclear fission deflagration wave has implications for embodiments of the nuclear fission modular nuclear fission deflagration wave reactor 10. As a first example, local material temperature feedback can be imposed on the local nuclear reaction rate at an acceptable expense in the deflagration wave's neutron economy. Such a large negative temperature coefficient of neutronic reactivity confers an ability to control the speed-of-advance of the deflagration wave. If very little thermal power is extracted from the burning fuel, its temperature rises and the temperature-dependent reactivity falls, and the nuclear fission rate at wave-center becomes correspondingly small and the wave's equation-of-time reflects only a very small axial rate-of-advance. Similarly, if the thermal power removal rate is large, the material temperature decreases and the neutronic reactivity rises, the intra-wave neutron economy becomes relatively undamped, and the wave advances axially relatively rapidly. Details regarding illustrative implementations of temperature feedback that may be incorporated within embodiments of the nuclear fission deflagration wave reactor core 14 are described in U.S. patent application Ser. No. 11/605,933, entitled CONTROLLABLE LONG TERM OPERATION OF A NUCLEAR REACTOR, naming RODERICK A. HYDE, MURIEL Y. ISHIKAWA, NATHAN P. MYHRVOLD, AND LOWELL L. WOOD, JR. as inventors, filed 28 Nov. 2006, the entire contents of which are hereby incorporated by reference.

As a second example of implications of propagation of a nuclear fission deflagration wave on embodiments of the nuclear fission modular nuclear fission deflagration wave reactor 10, less than all of the total fission neutron production in the nuclear fission modular nuclear fission deflagration wave reactor 10 may be utilized. For example, the local material-temperature thermostating modules may use around 5-10% of the total fission neutron production in the nuclear fission modular nuclear fission deflagration wave reactor 10. Another ≤10% of the total fission neutron production in the nuclear fission modular nuclear fission deflagration wave reactor 10 may be lost to parasitic absorption in the relatively large quantities of high-performance, high temperature, structure materials (such as Ta, W, or Re) employed in structural components of the nuclear fission modular nuclear fission deflagration wave reactor 10. This loss occurs in order to realize ≥60% thermodynamic efficiency in conversion to electricity and to gain high system safety figures-of-merit. The Zs of these materials, such as Ta, W and Re, are approximately 80% of that of the actinides, and thus their radiative capture cross-sections for high-energy neutrons are not particularly small compared to those of the actinides, as is indicated for Ta in FIGS. 1B and 1C. A final 5-10% of the total fission neutron production in the nuclear fission modular nuclear fission deflagration wave reactor 10 may be lost to parasitic absorption in fission products. As noted above, the neutron economy characteristically is sufficiently rich that approximately 0.7 of total fission neutron production is sufficient to sustain deflagration wave-propagation in the absence of leakage and rapid geometric divergence. This is in sharp contrast with (epi) thermal-neutron power reactors employing low-enrichment fuel, for which neutron-economy discipline in design and operation must be strict.

Figure 1D:
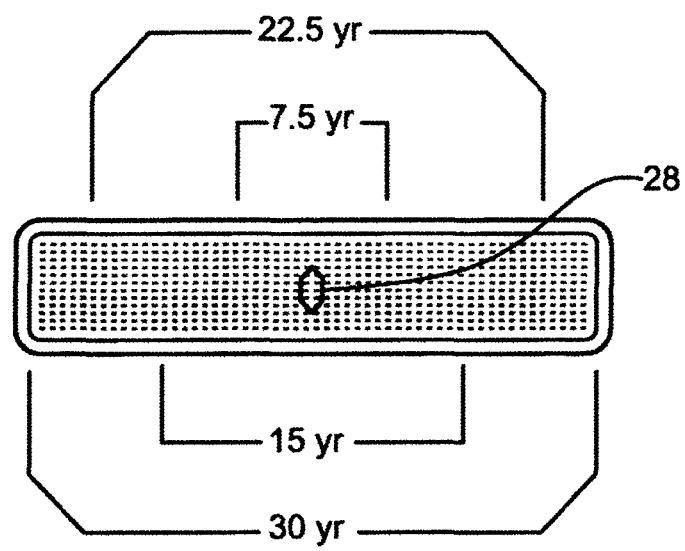
FIGS. 1D through 1H illustrate relative concentrations during times at operation of a nuclear fission reactor at power.
Figure 1E:
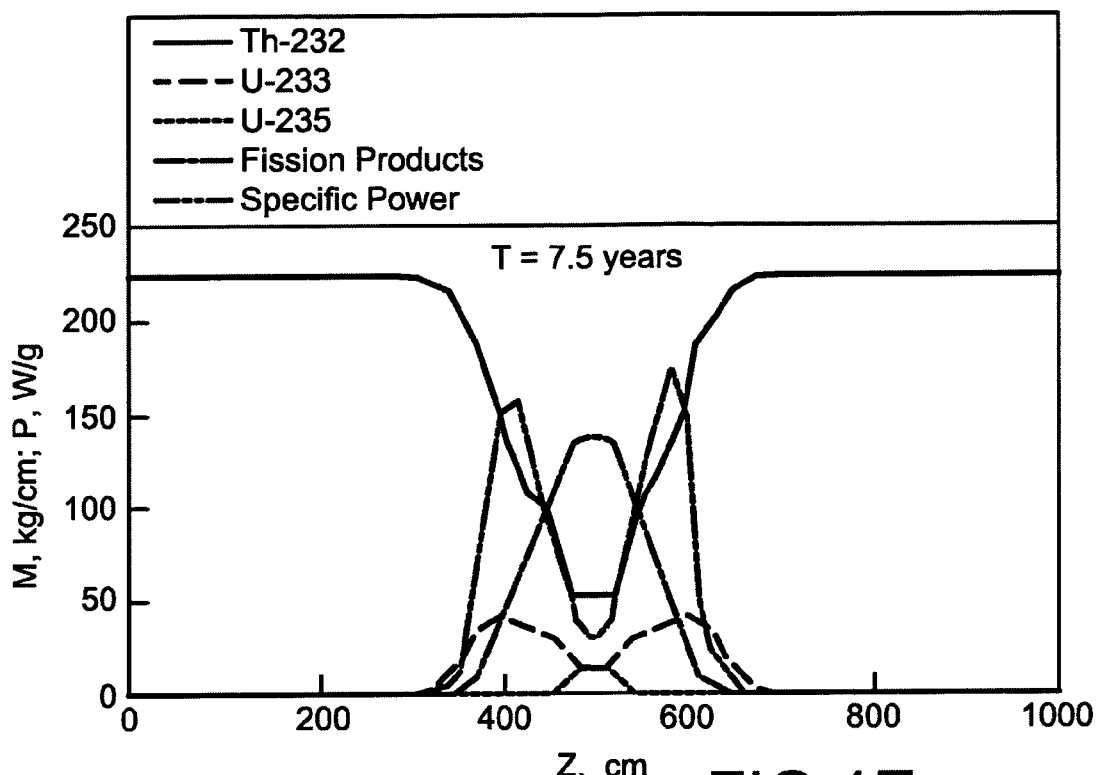
Figure 1F:
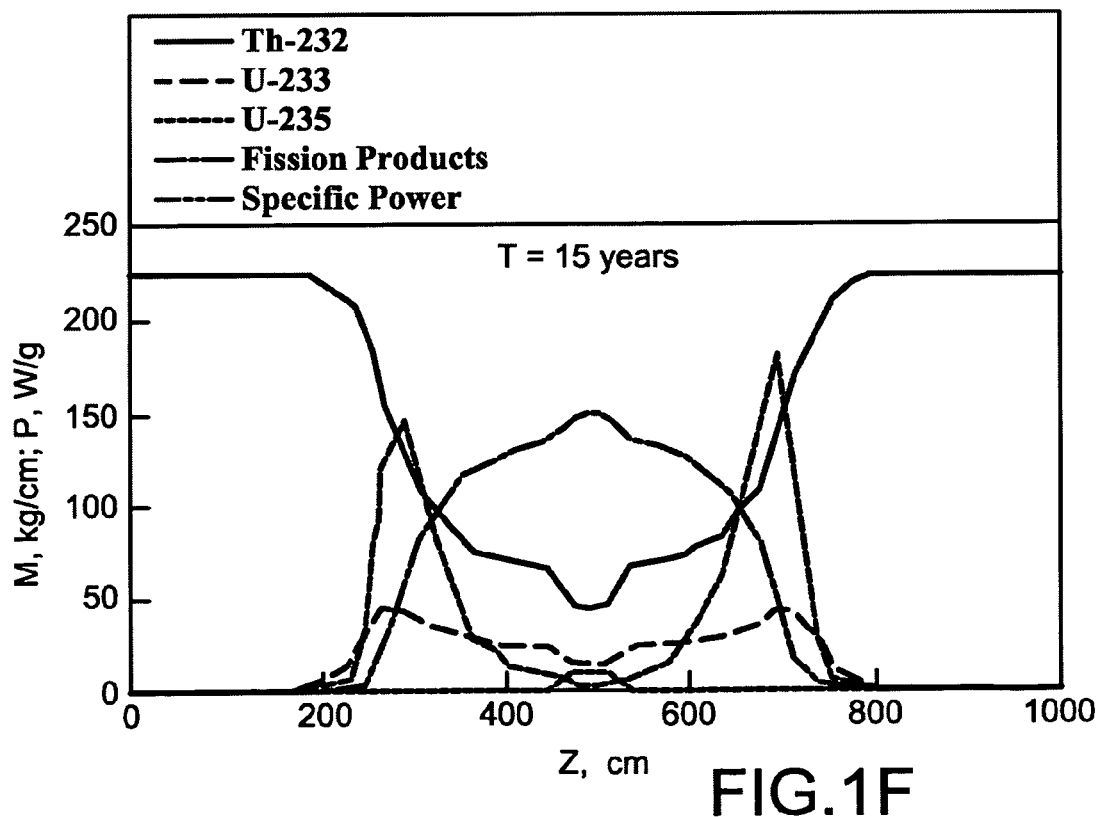
Figure 1G:
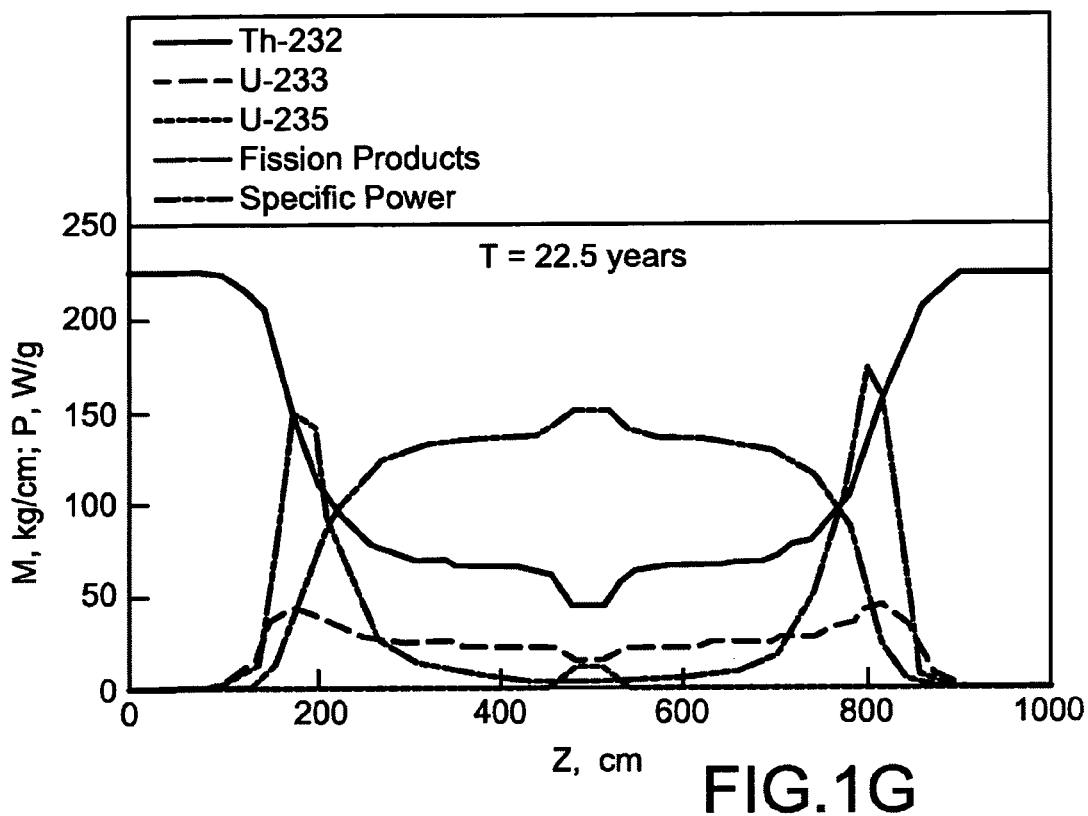
Figure 1H:
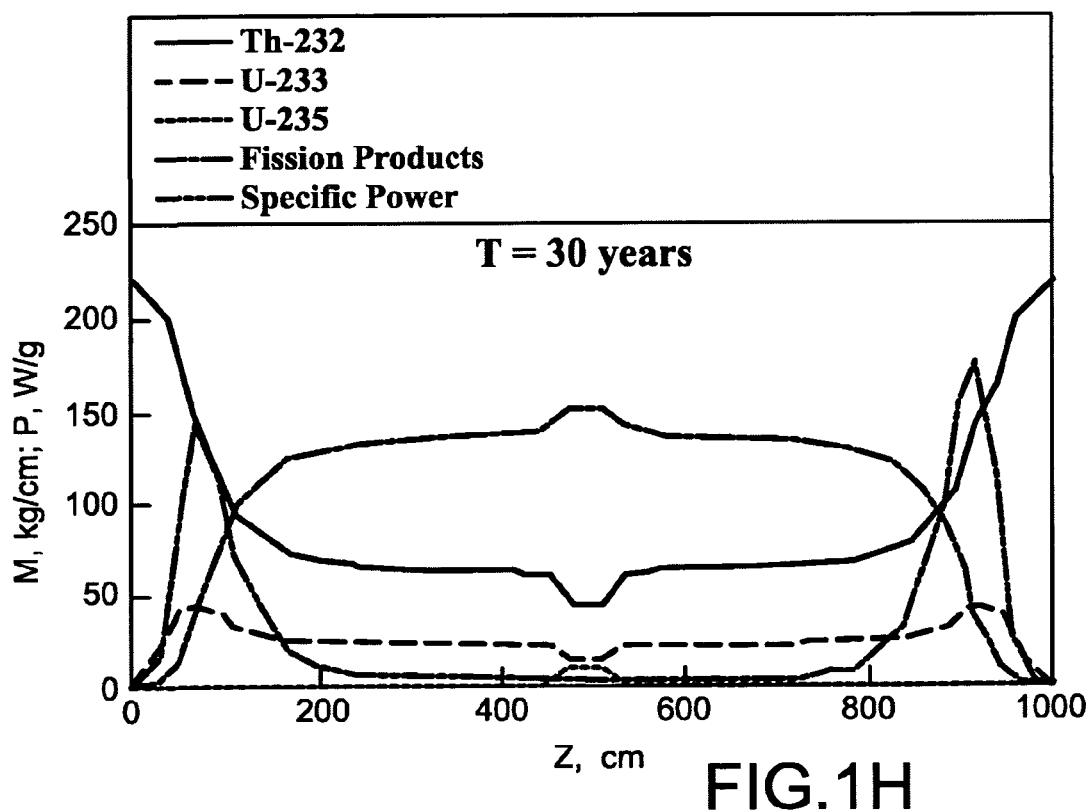

As a third example of implications of propagation of a nuclear fission deflagration wave on embodiments of the modular nuclear fission deflagration wave reactor 10, high burn-ups (on the order of around 50% to around 80%) of initial actinide fuel-inventories which are characteristic of the nuclear fission deflagration waves permit high-efficiency utilization of as-mined fuel—moreover without a requirement for reprocessing. Referring now to FIGS. 1D-1H, features of the fuel-charge of embodiments of the nuclear fission deflagration wave reactor core 14 are depicted at four equi-spaced times during the operational life of the reactor after origination of the nuclear fission deflagration wave (referred to herein as "nuclear fission ignition") in a scenario in which full reactor power is continuously demanded over a ⅓ century time-interval. In the embodiment shown, two nuclear fission deflagration wavefronts propagate from an origination point 28 (near the center of the nuclear fission deflagration wave reactor core 14 and in which the nuclear fission igniter is located) toward ends of the nuclear fission deflagration wave reactor core 14. Corresponding positions of the leading edge of the nuclear fission deflagration wave-pair at various time-points after full ignition of the fuel-charge of the nuclear fission deflagration wave reactor core 14 are indicated in FIG. 1D. FIGS. 1E, 1F, 1G, and 1G illustrate masses (in kg of total mass per cm of axial core-length) of various isotopic components in a set of representative near-axial zones and fuel specific power (in W/g) at the indicated axial position as ordinate-values versus axial position along an illustrative, non-limiting 10-meter-length of the fuel-charge as an abscissal value at approximate times after nuclear fission ignition of approximately 7.5 years, 15 years, 22.5 years, and 30 years, respectively. The central perturbation is due to the presence of the nuclear fission igniter indicated by the origination point 28 (FIG. 1D).

It will be noted that the neutron flux from the most intensely burning region behind the burnfront breeds a fissile isotope-rich region at the burnfront's leading-edge, thereby serving to advance the nuclear fission deflagration wave.

After the nuclear fission deflagration wave's burnfront has swept over a given mass of fuel, the fissile atom concentration continues to rise for as long as radiative capture of neutrons on available fertile nuclei is considerably more likely than on fission product nuclei, while ongoing fission generates an ever-greater mass of fission products. Nuclear power-production density peaks in this region of the fuel-charge, at any given moment. It will also be noted that in the illustrated embodiments, differing actions of two slightly different types of thermostating units on the left and the right sides of the nuclear fission igniter account for the corresponding slightly differing power production levels.

Still referring to FIGS. 1D-1H, it can be seen that well behind the nuclear fission deflagration wave's advancing burnfront, the concentration ratio of fission product nuclei (whose mass closely averages half that of a fissile nucleus) to fissile ones climbs to a value comparable to the ratio of the fissile fission to the fission product radiative capture cross-sections (FIG. 1B), the "local neutronic reactivity" thereupon goes slightly negative, and both burning and breeding effectively cease—as will be appreciated from comparing FIGS. 1E, 1F, 1G, and 1H with each other, far behind the nuclear fission deflagration wave burnfront.

In some embodiments of the modular nuclear fission deflagration wave reactor 10, all the nuclear fission fuel ever used in the reactor is installed during manufacture of the nuclear fission deflagration wave reactor core 14, and no spent fuel is ever removed from the nuclear fission deflagration wave reactor core 14, which is never accessed after nuclear fission ignition. However, in some other embodiments of the modular nuclear fission deflagration wave reactor 10, additional nuclear fission fuel is added to the nuclear fission deflagration wave reactor core 14 after nuclear fission ignition. However, in some other embodiments of the modular nuclear fission deflagration wave reactor 10, spent fuel is removed from the reactor core assembly (and, in some embodiments, removal of spent fuel from the nuclear fission deflagration wave reactor core 14 may be performed while the modular nuclear fission deflagration wave reactor 10 is operating at power). Such illustrative refueling and defueling is explained in U.S. Pat. No. 7,860,207, entitled METHOD AND SYSTEM FOR PROVIDING FUEL IN A NUCLEAR REACTOR, naming RODERICK A. HYDE, MURIEL Y. ISHIKAWA, NATHAN P. MYHRVOLD, AND LOWELL L. WOOD, JR. as inventors, granted 28 Dec. 2010, the contents of which are hereby incorporated by reference. Regardless of whether or not spent fuel is removed, pre-expansion of the as-loaded fuel permits higher-density actinides to be replaced with lower-density fission products without any overall volume changes in fuel elements, as the nuclear fission deflagration wave sweeps over any given axial element of actinide 'fuel,' converting it into fission-product 'ash.'

Given by way of overview, launching of nuclear fission deflagration waves into $^{232}$Th or $^{238}$U fuel-charges is readily accomplished with 'nuclear fission igniter modules' enriched in fissile isotopes. Illustrative nuclear fission igniter modules and methods for launching nuclear fission deflagration waves are discussed in detail in a co-pending U.S. Pat. No. 9,230,695, entitled NUCLEAR FISSION IGNITER naming CHARLES E. AHLFELD, JOHN ROGERS GILLELAND, RODERICK A. HYDE, MURIEL Y. ISHIKAWA, DAVID G. MCALEES, NATHAN P. MYHRVOLD, CHARLES WITMER, AND LOWELL L. WOOD, JR. as inventors, granted 5 Jan. 2016, the entire contents of which are hereby incorporated by reference. Higher enrichments result in more compact modules, and minimum mass modules may employ moderator concentration gradients. In addition, nuclear fission igniter module design may be determined in part by non-technical considerations, such as resistance to materials diversion for military purposes in various scenarios.

In other approaches, illustrative nuclear fission igniters may have other types of reactivity sources. For example, other nuclear fission igniters may include "burning embers", e.g., nuclear fission fuel enriched in fissile isotopes via exposure to neutrons within a propagating nuclear fission deflagration wave reactor. Such "burning embers" may function as nuclear fission igniters, despite the presence of various amounts of fission products "ash". In other approaches to launching a nuclear fission deflagration wave, nuclear fission igniter modules enriched in fissile isotopes may be used to supplement other neutron sources that use electrically driven sources of high energy ions (such as protons, deuterons, alpha particles, or the like) or electrons that may in turn produce neutrons. In one illustrative approach, a particle accelerator, such as a linear accelerator may be positioned to provide high energy protons to an intermediate material that may in turn provide such neutrons (e.g., through spallation). In another illustrative approach, a particle accelerator, such as a linear accelerator may be positioned to provide high energy electrons to an intermediate material that may in turn provide such neutrons (e.g., by electro-fission and/or photofission of high-Z elements). Alternatively, other known neutron emissive processes and structures, such as electrically induced fusion approaches, may provide neutrons (e.g., 14 Mev neutrons from D-T fusion) that may thereby be used in addition to nuclear fission igniter modules enriched in fissile isotopes to initiate the propagating fission wave.

Now that nucleonics of the fuel charge and the nuclear fission deflagration wave have been discussed, further details regarding "nuclear fission ignition" and maintenance of the nuclear fission deflagration wave will be discussed. A centrally-positioned illustrative nuclear fission igniter moderately enriched in fissionable material, such as $^{235}$U or $^{239}$Pu, has a neutron-absorbing material (such as a borohydride) removed from it (such as by operator-commanded electrical heating), and the nuclear fission igniter becomes neutronically critical. Local fuel temperature rises to a design setpoint and is regulated thereafter by the local thermostating modules (discussed in detail in U.S. patent application Ser. No. 11/605,943, entitled AUTOMATED NUCLEAR POWER REACTOR FOR LONG-TERM OPERATION, naming RODERICK A. HYDE, MURIEL Y. ISHIKAWA, NATHAN P. MYHRVOLD, AND LOWELL L. WOOD, JR. as inventors, filed 28 Nov. 2006, the entire contents of which are hereby incorporated by reference). Neutrons from the fast fission of $^{235}$U or $^{239}$Pu are mostly captured at first on local $^{238}$U or $^{232}$Th.

It will be appreciated that uranium enrichment of the nuclear fission igniter may be reduced to levels not much greater than that of light water reactor (LWR) fuel by introduction into the nuclear fission igniter and the fuel region immediately surrounding it of a radial density gradient of a refractory moderator, such as graphite. High moderator density enables low-enrichment fuel to burn satisfactorily, while decreasing moderator density permits efficient fissile breeding to occur. Thus, optimum nuclear fission igniter design may involve trade-offs between proliferation robustness and the minimum latency from initial criticality to the availability of full-rated-power from the fully-ignited fuel-charge of the core. Lower nuclear fission igniter enrichments entail more breeding generations and thus impose longer latencies.

The peak (unregulated) reactivity of the nuclear fission deflagration wave reactor core 14 slowly decreases in the first phase of the nuclear fission ignition process because, although the total fissile isotope inventory is increasing monotonically, this total inventory is becoming more spatially dispersed. As a result of choice of initial fuel geometry, fuel enrichment versus position, and fuel density, it may be arranged for the maximum reactivity to still be slightly positive at the time-point at which its minimum value is attained. Soon thereafter, the maximum reactivity begins to increase rapidly toward its greatest value, corresponding to the fissile isotope inventory in the region of breeding substantially exceeding that remaining in the nuclear fission igniter. A quasi-spherical annular shell then provides maximum specific power production. At this point, the fuel-charge of the nuclear fission deflagration wave reactor core 14 is referred to as "ignited."

Now that the fuel-charge of the nuclear fission deflagration wave reactor core 14 has been "ignited", propagation of the nuclear fission deflagration wave, also referred to herein as "nuclear fission burning", will now be discussed. The spherically-diverging shell of maximum specific nuclear power production continues to advance radially from the nuclear fission igniter toward the outer surface of the fuel charge. When it reaches this surface, it naturally breaks into two spherical zonal surfaces, with one surface propagating in each of the two opposite directions along the axis of the cylinder. At this time-point, the full thermal power production potential of the core has been developed. This interval is characterized as that of the launching of the two axially-propagating nuclear fission deflagration wave burnfronts. In some embodiments the center of the core's fuel-charge is ignited, thus generating two oppositely-propagating waves. This arrangement doubles the mass and volume of the core in which power production occurs at any given time, and thus decreases by two-fold the core's peak specific power generation, thereby quantitatively minimizing thermal transport challenges. However, in other embodiments, the core's fuel charge is ignited at one end, as desired for a particular application. In other embodiments, the core's fuel charge may be ignited in multiple sites. In yet other embodiments, the core's fuel charge is ignited at any 3-D location within the core as desired for a particular application. In some embodiments, two propagating nuclear fission deflagration waves will be initiated and propagate away from a nuclear fission ignition site, however, depending upon geometry, nuclear fission fuel composition, the action of neutron modifying control structures or other considerations, different numbers (e.g., one, three, or more) of nuclear fission deflagration waves may be initiated and propagated. However, for sake of understanding, the discussion herein refers, without limitation, to propagation of two nuclear fission deflagration wave burnfronts.

From this time forward through the break-out of the two waves when they reach the two opposite ends, the physics of nuclear power generation is effectively time-stationary in the frame of either wave, as illustrated in FIGS. 1E-1H. The speed of wave advance through the fuel is proportional to the local neutron flux, which in turn is linearly dependent on the thermal power demanded from the nuclear fission deflagration wave reactor core 14 via the collective action on the nuclear fission deflagration wave's neutron budget of the thermostating modules (not shown).

When more power is demanded from the reactor via lower-temperature coolant flowing into the core, the temperature of the two ends of the core (which in some embodiments are closest to the coolant inlets) decreases slightly below the thermostating modules' design set-point, a neutron absorber is thereby withdrawn from the corresponding sub-population of the core's thermostating modules, and the local neutron flux is permitted thereby to increase to bring the local thermal power production to the level which drives the local material temperature up to the set-point of the local thermostating modules.

However, in the two burnfront embodiment this process is not effective in heating the coolant significantly until its two divided flows move into the two nuclear burn-fronts. These two portions of the core's fuel-charge—which are capable of producing significant levels of nuclear power when not suppressed by the neutron absorbers of the thermostating modules—then act to heat the coolant to the temperature specified by the design set-point of their modules, provided that the nuclear fission fuel temperature does not become excessive (and regardless of the temperature at which the coolant arrived in the core). The two coolant flows then move through the two sections of already-burned fuel centerward of the two burnfronts, removing residual nuclear fission and afterheat thermal power from them, both exiting the fuel-charge at its center. This arrangement encourages the propagation of the two burnfronts toward the two ends of the fuel-charge by "trimming" excess neutrons primarily from the trailing edge of each front, as illustrated in FIGS. 1E-1H.

Thus, the core's neutronics may be considered to be substantially self-regulated. For example, for cylindrical core embodiments, the core's nucleonics may be considered to be substantially self-regulating when the fuel density-radius product of the cylindrical core is $\geq 200$ gm/cm$^2$ (that is, 1-2 mean free paths for neutron-induced fission in a core of typical composition, for a reasonably fast neutron spectrum). One function of the neutron reflector in such core designs is to substantially reduce the fast neutron fluence seen by the outer portions of the reactor, such as its radiation shield, structural supports, thermostating modules and outermost shell. Its incidental influence on the performance of the core is to improve the breeding efficiency and the specific power in the outermost portions of the fuel, though the value of this is primarily an enhancement of the reactor's economic efficiency. Outlying portions of the fuel-charge are not used at low overall energetic efficiency, but have isotopic burn-up levels comparable to those at the center of the fuel-charge.

Final, irreversible negation of the core's neutronic reactivity may be performed at any time by injection of neutronic poison into the coolant stream as desired. For example, lightly loading the coolant stream with a material such as $BF_3$, possibly accompanied by a volatile reducing agent such as $H_2$ if desired, may deposit metallic boron substantially uniformly over the inner walls of coolant-tubes threading through the reactor's core, via exponential acceleration of the otherwise slow chemical reaction $2BF_3 + 3H_2 \rightarrow 2B + 6HF$ by the high temperatures found therein. Boron, in turn, is a highly refractory metalloid, and will not migrate from its site of deposition. Substantially uniform presence of boron in the core in <100 kg quantities may negate the core's neutronic reactivity for indefinitely prolonged intervals without involving the use of powered mechanisms in the vicinity of the reactor.

Illustrative Embodiments of Modular Nuclear Fission Reactor

Now that some of the considerations behind some of the embodiments of the modular nuclear fission deflagration wave reactor 10 have been set forth, further details regarding illustrative embodiments of the modular nuclear fission deflagration wave reactor 10 will be explained. It is emphasized that the following description of illustrative embodiments of the modular nuclear fission deflagration wave reactor 10 is given by way of non-limiting example only and not by way of limitation. As mentioned above, several embodiments of the modular nuclear fission deflagration wave reactor 10 are contemplated, as well as further aspects of the modular nuclear fission deflagration wave reactor 10. After details regarding an illustrative embodiment of the modular nuclear fission deflagration wave reactor 10 are discussed, other embodiments and aspects will also be discussed.

Figure 1I:
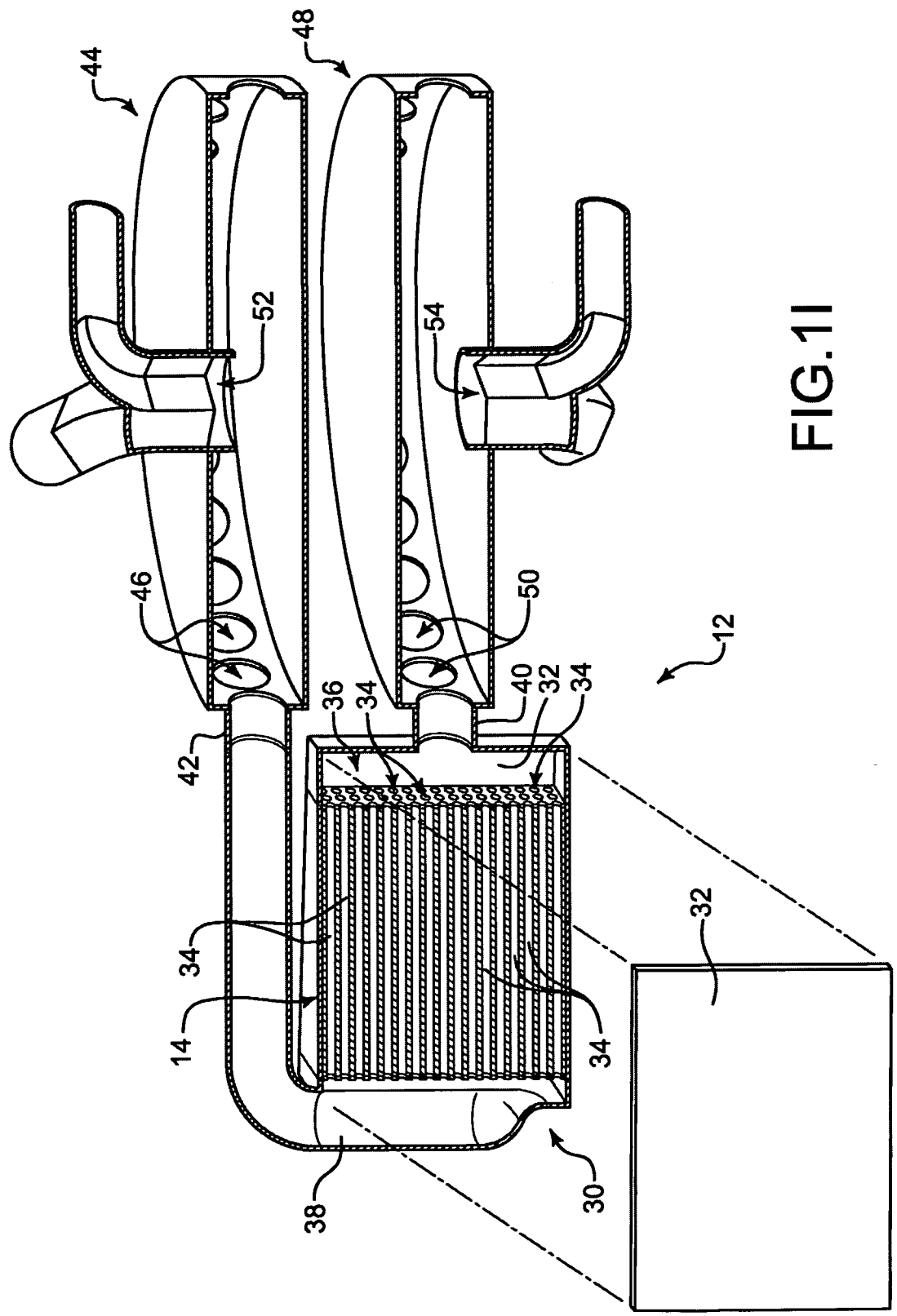
FIGS. 1I and 1J are partially exploded perspective views in schematic form of illustrative components of an illustrative modular nuclear fission deflagration wave reactor.
Figure 1J:
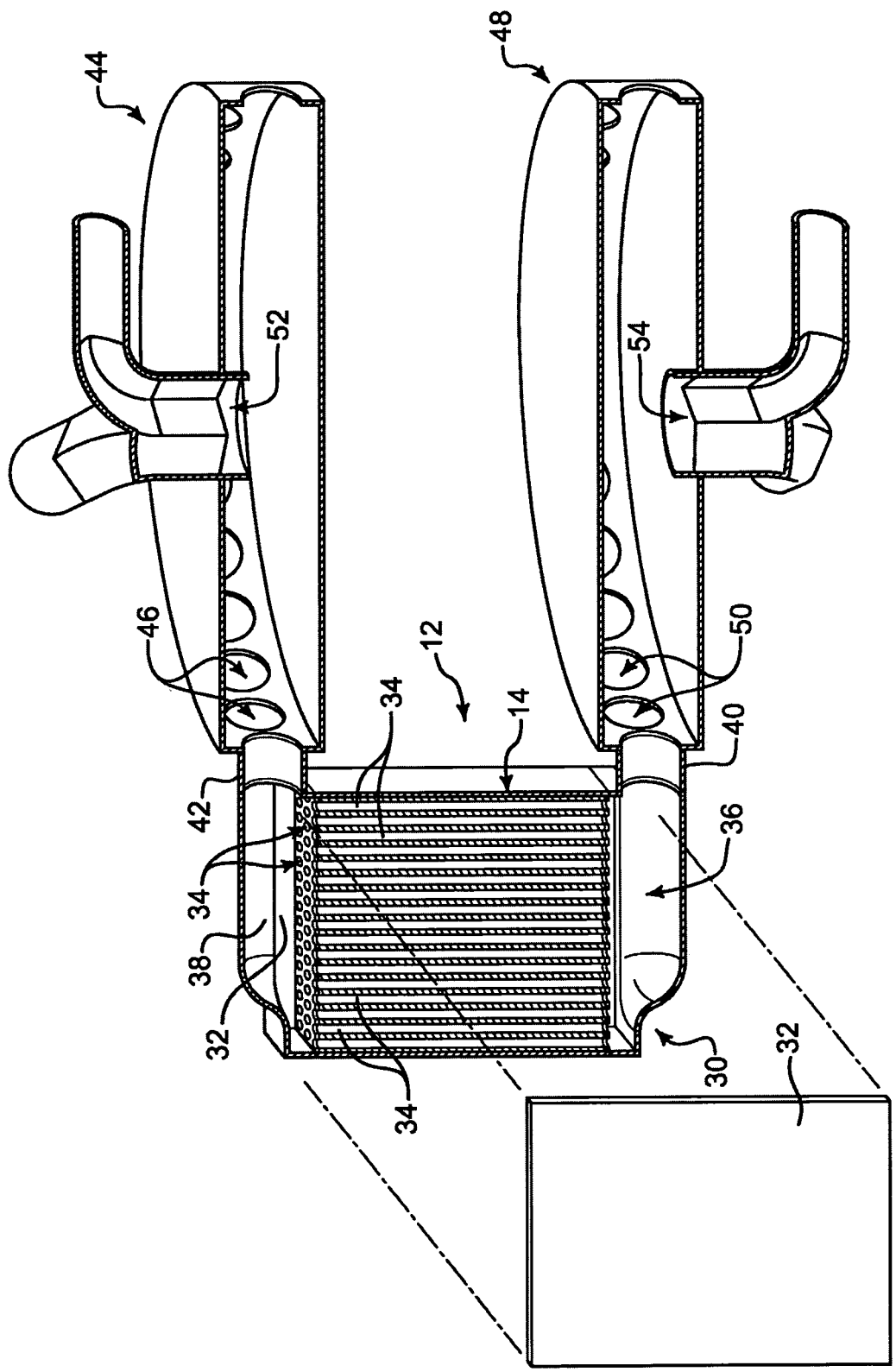

Referring now to FIGS. 1A, 1I, and 1J, the illustrative modular nuclear fission deflagration wave reactor 10 is shown by way of illustration and not limitation as a torroidal arrangement of the nuclear fission deflagration wave reactor modules 12. It will be understood that no limitation to such a geometric arrangement or to any geometric arrangement of any type whatsoever is intended. To that end, additional arrangements of the nuclear fission deflagration wave reactor modules 12 will be discussed further below. In the interest of brevity, the description of additional arrangements of the nuclear fission deflagration wave reactor modules 12 is limited to those illustrated herein. However, it will be appreciated that the nuclear fission deflagration wave reactor modules 12 may be arranged in any manner whatsoever as desired that accommodates neutronically coupling of adjacent nuclear fission deflagration wave reactor modules 12.

As discussed above, the illustrative modular nuclear fission deflagration wave reactor 10 suitably includes the nuclear fission deflagration wave reactor modules 12. As also discussed above, each nuclear fission deflagration wave reactor module 12 suitably includes a nuclear fission deflagration wave reactor core 14 and a reactor coolant system 16. Each nuclear fission deflagration wave reactor module 12 is operatively coupled in fluid communication to at least one heat sink 18 via its reactor coolant system 16. That is, each of the nuclear fission deflagration wave reactor modules 12 suitably can be considered a complete, stand-alone nuclear fission deflagration wave reactor by itself. Any nuclear fission deflagration wave reactor module 12 is neutronically coupled to at least one adjacent nuclear fission deflagration wave reactor module 12. While many embodiments of the modular nuclear fission deflagration wave reactor 10 are contemplated, a common feature among many contemplated embodiments of the modular nuclear fission deflagration wave reactor 10 is neutronically coupling of adjacent nuclear fission deflagration wave reactor modules 12 via origination of a nuclear fission deflagration wave, or "burnfront".

As discussed above, the nuclear fission deflagration wave reactor modules 12 suitably are fast spectrum nuclear fission breeder reactor modules. To that end, at least one of the nuclear fission deflagration wave reactor cores 14 includes nuclear fission fuel material that is inherently subcritical. That is, the nuclear fission fuel material has $k_\infty < 1$. As such, the initial fuel material (that is, before initial start-up) is predominantly fertile (as opposed to fissile). Upon initial start-up of the nuclear deflagration wave reactor, an inherently subcritical nuclear fission deflagration wave reactor core 14 is not critical; an inherently subcritical nuclear fission deflagration wave reactor core 14 becomes critical as a result of breeding. One or more of the nuclear fission deflagration wave reactor cores 14 may be inherently critical in order to serve as an igniter for the modular nuclear fission deflagration wave reactor 10. Such an inherently critical nuclear fission deflagration wave reactor core 14 has sufficient amounts of fissile fuel so that it has (under at least some conditions) $k_{eff} > 1$, and can initiate a nuclear fission deflagration wave in itself and/or in one or more neighboring inherently subcritical nuclear fission deflagration wave reactor cores 14.

The nuclear fission deflagration wave reactor core 14 is a neutronically "large" device. Accordingly, each nuclear fission deflagration wave reactor core 14 has three characteristic dimensions, each of which is typically not substantially less than one mean free path for fission inducing neutrons (i.e., the nuclear fission deflagration wave's fast neutron spectrum). For a nuclear fission deflagration wave reactor core having a rectangular prism shape, the three characteristic dimensions are those of its three sides. For more generally shaped nuclear fission deflagration wave reactor cores, the characteristic dimensions are selected to be the three side dimensions of the minimal volume superscribing rectangular prism which encloses the nuclear fission deflagration wave reactor core 14. For each possible angular orientation, a locally minimal superscribing rectangular prism is mathematically determined by reducing each of the orthogonal side dimensions until the opposing faces contact the surface of the nuclear fission deflagration wave reactor core. The minimal volume superscribing rectangular prism may then be determined by mathematically searching over possible orientations, and selecting the minimal volume superscribing rectangular prism to be the locally minimal superscribing rectangular prism which has the least volume.

Each nuclear fission deflagration wave reactor module 12 includes a reactor core housing 30. The reactor core housing 30 may serve as a reactor pressure vessel. Portions of the reactor core housing 30 that are not proximate adjacent nuclear fission deflagration wave reactor cores 14 may be made from any materials acceptable for use in reactor pressure vessels, such as without limitation stainless steel. Except as noted below, within the reactor core housing 30 a neutron reflector (not shown) and a radiation shield (not shown) can surround the nuclear fission deflagration wave reactor core 14. In some embodiments, the reactor pressure vessel 12 is sited underground. In such cases, the reactor core housing 30 can also function as a burial cask for the nuclear fission deflagration wave reactor core 14. In these embodiments, the reactor core housing 30 suitably is surrounded by a region (not shown) of isolation material, such as dry sand, for long-term environmental isolation. The region (not shown) of isolation material may have a size of around 100 m in diameter or so. However, in other embodiments, the reactor core housing 30 is sited on or toward the Earth's surface.

Each nuclear fission deflagration wave reactor module 12 can be neutronically coupled to its adjacent nuclear fission deflagration wave reactor modules 12 through proximate wall segments 32 of their reactor core housings 30. The wall segments 32 are shown as being removed from the reactor core housing 30 for clarity of illustration. The wall segments 32 are made of neutronically translucent material. That is, the wall segments 32 suitably can be neutron scatterers but do not have substantial neutron absorption (for the nuclear fission deflagration wave's fast fission neutron spectrum). Neutronically translucent material suitable for use in the wall segments 32 include, by way of non-limiting example, metal, refractory metal, high-Z metal, ceramic, carbon, composite material, and stainless steel. In addition, in order to permit neutronic coupling of adjacent nuclear fission deflagration wave reactor cores 14 through the wall segments 32, the neutron reflector (not shown) and the radiation shield (not shown) may not surround the nuclear fission deflagration wave reactor core 14 proximate portions of the inner surface area of the wall segment 32. Alternatively, in embodiments in which the neutron reflector or the radiation shield do surround the nuclear fission deflagration wave reactor core 14 proximate portions of the inner surface area of the wall segment 32, the amount of the neutron reflector or the radiation shield is selected so as to not prevent successful neutronic coupling across the wall segment 32.

Each nuclear fission deflagration wave reactor core 14 defines coolant channels 34. The coolant channels 34 may be defined substantially horizontally (FIG. 1I) or substantially vertically (FIG. 1J) as desired for a particular application. For example, the substantially vertical coolant channels 34 (FIG. 1J) may help reduce resistance to reactor fluid flow therethrough. Thus, use of the substantially vertical coolant channels 34 (FIG. 1J) may help mitigate reductions in thermal driving head in natural circulation applications. However, it will also be appreciated that the substantially horizontal coolant channels 34 (FIG. 1I) may also be used in natural circulation applications as desired. It will also be appreciated that the substantially vertical coolant channels 34 (FIG. 1J) or the substantially horizontal coolant channels 34 (FIG. 1I) may be used in forced circulation applications as desired.

The coolant channels 34 are operatively coupled in fluid communication with an inlet plenum 36 and an outlet plenum 38 in the reactor core housing 30. At least a portion of the reactor coolant system 16, such as cold leg piping 40 of the reactor coolant system 16, is coupled to the inlet plenum 36 and at least a portion of the reactor coolant system 16, such as hot leg piping 42 of the reactor coolant system 16, is coupled to the outlet plenum 38.

The reactor coolant may be selected as desired for a particular application. In some embodiments, the reactor coolant suitably is helium (He) gas. In other embodiments, the reactor coolant suitably may be other pressurized inert gases, such as neon, argon, krypton, xenon, or other fluids such as water or gaseous or superfluidic carbon dioxide, or liquid metals, such as sodium or lead, or metal alloys, such as Pb—Bi, or organic coolants, such as polyphenyls, or fluorocarbons. The cold leg piping 40 and the hot leg piping 42 suitably may be made from tantalum (Ta), tungsten (W), aluminum (Al), steel or other ferrous or non-iron groups alloys or titanium or zirconium-based alloys, or from other metals and alloys, or from other structural materials or composites, as desired.

A hot leg plenum 44 defines ports 46 about its periphery. The hot leg piping 42 can be inserted into the ports 46 to removably couple the hot leg plenum 44 and the hot leg piping 42. Conversely, the hot leg piping 42 can be removed from the port 46 to remove its associated nuclear fission deflagration wave reactor module 12 as desired.

Similarly, a cold leg plenum 48 defines ports 50 about its periphery. The cold leg piping 40 can be inserted into the ports 50 to removably couple the cold leg plenum 48 and the cold leg piping 40. Conversely, the cold leg piping 40 can be removed from the port 50 (in conjunction with removal of the hot leg piping 42 from the port 46) to remove its nuclear fission deflagration wave reactor module 12 as desired.

An outlet port 52 of the hot leg plenum 44 is coupled to provide hot leg fluid to an inlet port (not shown) of the heat sinks 18. An inlet port 54 of the cold leg plenum 48 is coupled to receive cold leg fluid from an outlet port (not shown) of the heat sinks 18.

The heat sinks 18 suitably may include without limitation a fluid-driven electrical turbine generator, such as without limitation a gas-driven electrical turbine generator or a steam-driven electrical turbine generator. The heat sinks 18 may also include without limitation a heat exchanger, such as without limitation a steam generator. However, it will be appreciated that the heat sinks 18 are not intended to be limited and, therefore, the heat sinks 18 can include any kind of heat sink as desired for a particular application. It will further be appreciated that any number whatsoever—that is, one or more—of the heat sinks 18 may be used as desired for a particular application. To that end, the number of heat sinks 18 need not be the same as the number of nuclear fission deflagration wave reactor modules 12.

In some embodiments the reactor coolant system 16 may be a natural circulation reactor coolant system. In such applications, the heat sinks 18 are physically located above the nuclear fission deflagration wave reactor modules 12 with a vertical separation sufficient to generate a thermal driving head as desired for a particular application. In some other embodiments the reactor coolant system 16 may be a forced circulation system. In such applications, suitable reactor coolant pumps (not shown for clarity of illustration) are disposed within the cold leg piping 40 or the hot leg piping 42 as desired for a particular application.

Figure 2A:
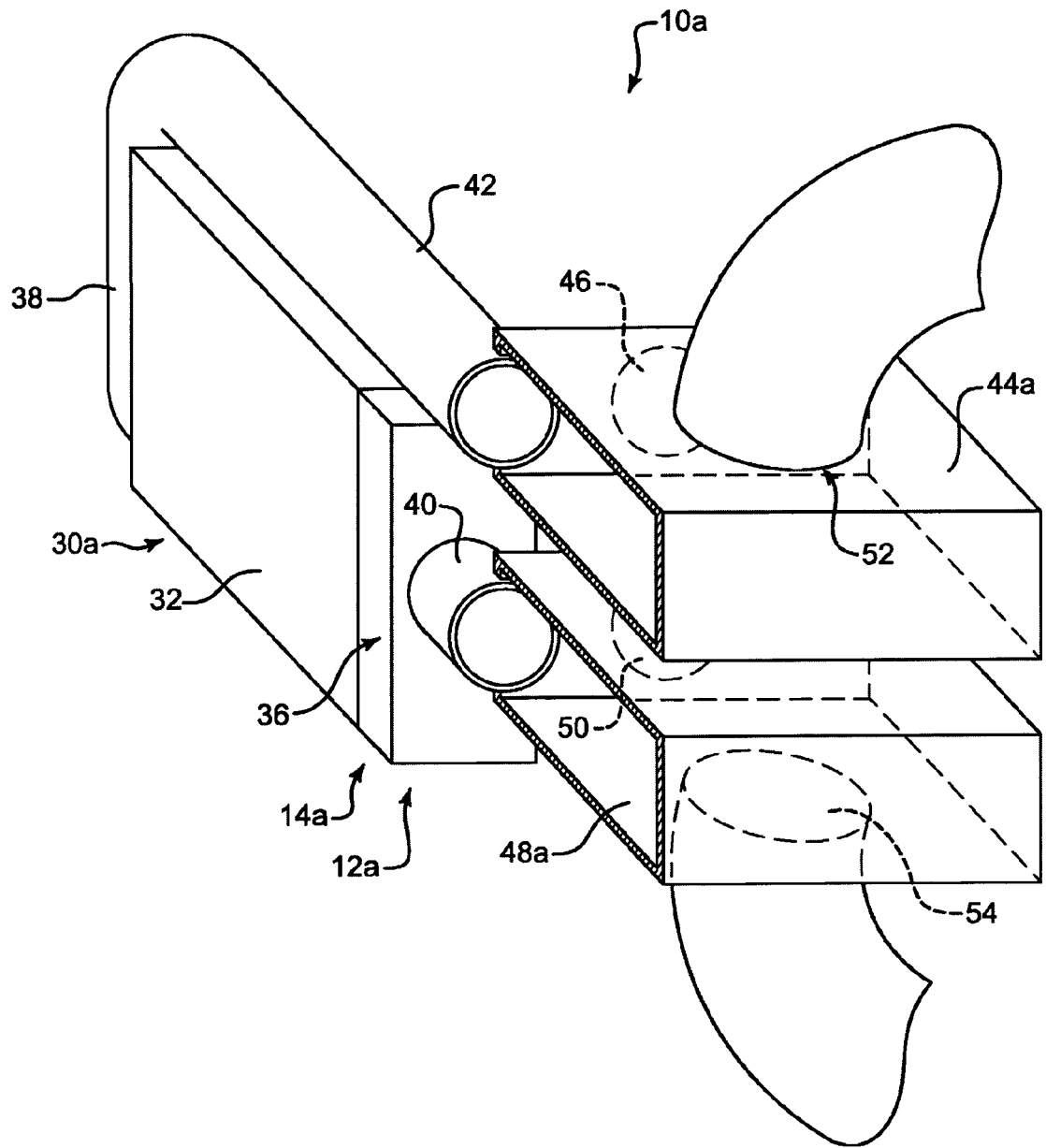
FIGS. 2A through 2C are partially exploded perspective views in schematic form of illustrative components of another illustrative modular nuclear fission deflagration wave reactor.
Figure 2B:
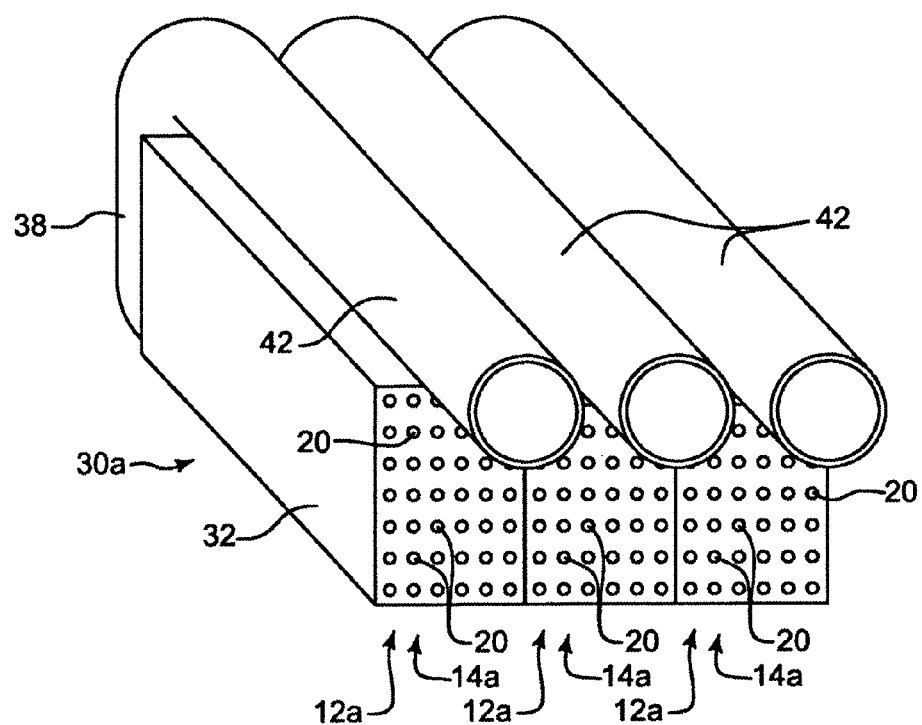
Figure 2C:
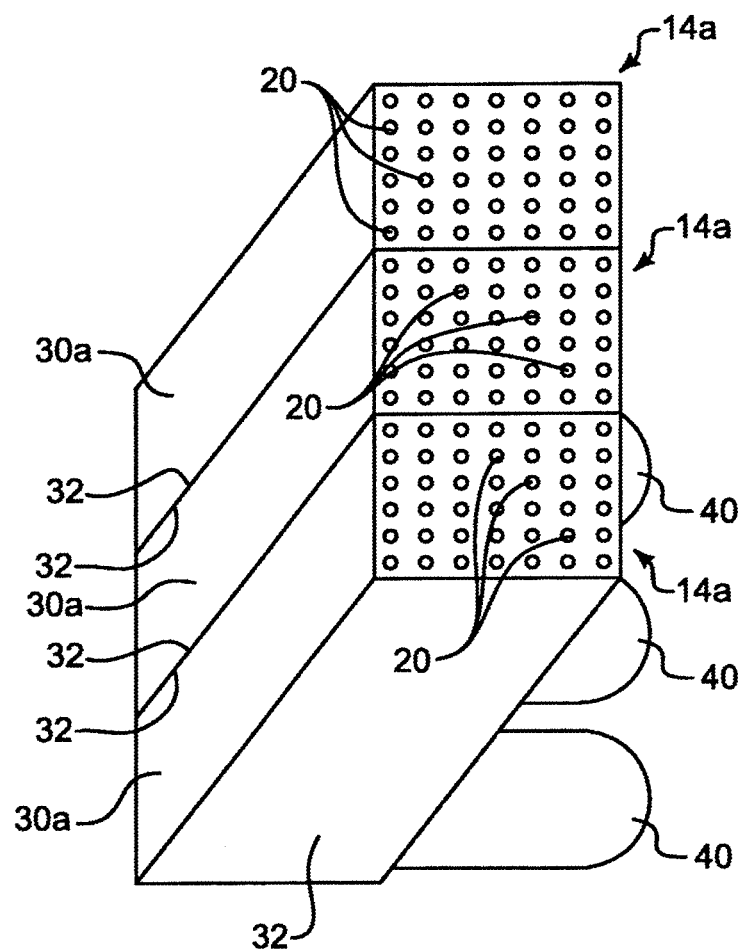

Referring now to FIGS. 2A, 2B, and 2C, in some other embodiments a modular nuclear fission deflagration wave reactor 10A includes substantially rectangular nuclear fission deflagration wave reactor modules 12A that can be neutronically coupled to each other through the wall segments 32. Nuclear fission deflagration wave reactor cores 14A are housed within substantially rectangular reactor core housings 30A. The cold leg piping is coupled to a substantially rectangular cold leg plenum 48A and the hot leg piping 42 coupled to a substantially rectangular hot leg plenum 44A. All other aspects of the modular nuclear fission deflagration wave reactor 10A are the same as those for the modular nuclear fission deflagration wave reactor 10 (FIGS. 1A, 1I, and 1J). Substantially horizontal coolant channels 20 are shown in FIG. 2B and substantially vertical coolant channels 20 are shown in FIG. 2C. Further details need not be repeated for an understanding.

It will be appreciated that arrangement and geometry of embodiments of modular nuclear fission deflagration wave reactors disclosed herein and their components, such as nuclear fission deflagration wave reactor modules and nuclear fission deflagration wave reactor cores and the like, are not intended to be limited to any geometry and/or arrangement whatsoever.

Illustrative Methods Associated with Modular Nuclear Fission Reactors

Now that illustrative embodiments of nuclear fission deflagration wave reactors have been discussed, illustrative methods associated therewith will now be discussed.

Following are a series of flowcharts depicting implementations of processes. For ease of understanding, the flowcharts are organized such that the initial flowcharts present implementations via an overall "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations. In addition, those skilled in the art will further appreciate that the style of presentation used herein also lends itself well to modular design paradigms.

Figure 3A:
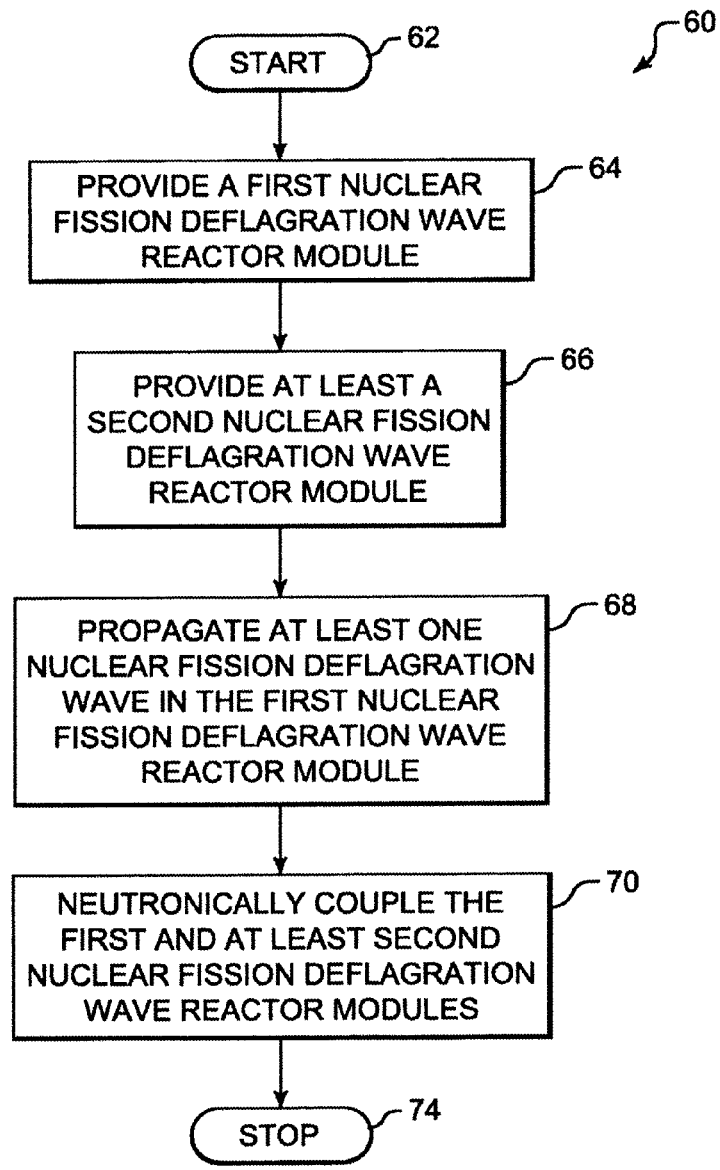
FIGS. 3A through 3J are flowcharts of illustrative methods associated with modular nuclear fission deflagration wave reactors.

Referring now to FIG. 3A, an illustrative method 60 is provided for operating a modular nuclear fission deflagration wave reactor. The method 60 starts at a block 62. At a block 64 a first nuclear fission deflagration wave reactor module is provided. At a block 66 at least a second nuclear fission deflagration wave reactor module is provided.

At a block 68 at least one nuclear fission deflagration wave is propagated in the first nuclear fission deflagration wave reactor module.

Figure 3B:
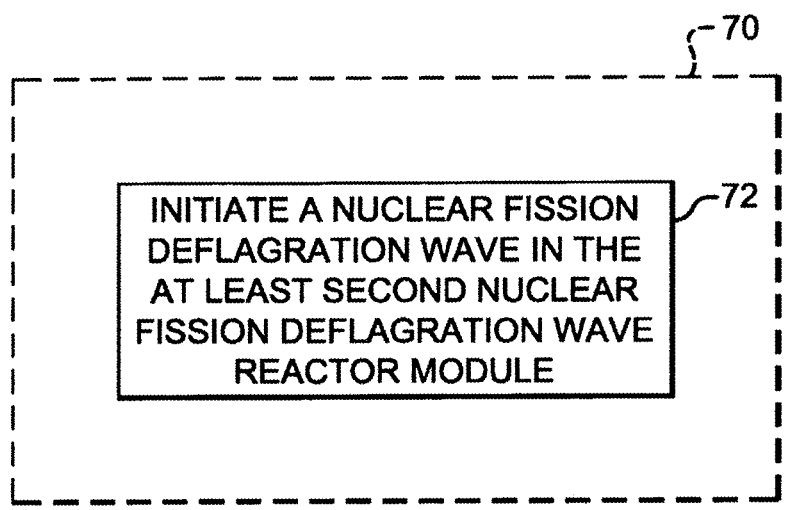

At a block 70 the first and at least second nuclear fission deflagration wave reactor modules are neutronically coupled. Referring additionally to FIG. 3B, the first and at least second nuclear fission deflagration wave reactor modules may be neutronically coupled at the block 70 by initiating a nuclear fission deflagration wave in the at least second nuclear fission deflagration wave reactor module at a block 72.

The method 60 stops at a block 74.

Figure 3C:
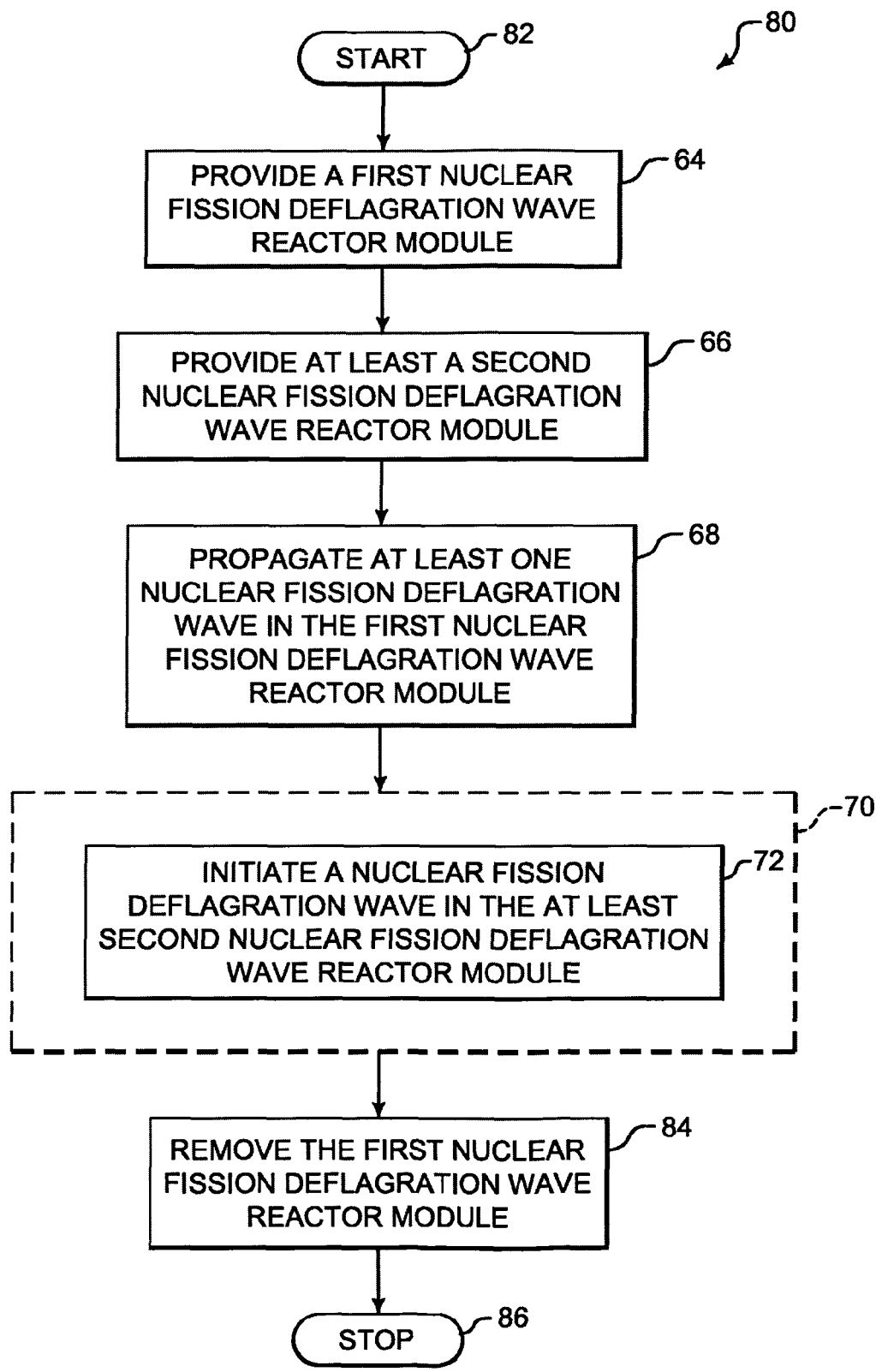

Referring now to FIG. 3C, a method 80 starts at a block 82. In the method 80, the blocks 64, 66, 68, 70, and 72 are performed as described above in conjunction with FIGS. 3A and 3B. After a nuclear fission deflagration wave has been initiated in the at least second nuclear fission deflagration wave reactor module at a block 72, the first nuclear fission deflagration wave reactor module is removed at a block 84.

The method 80 stops at a block 86.

Figure 3D:
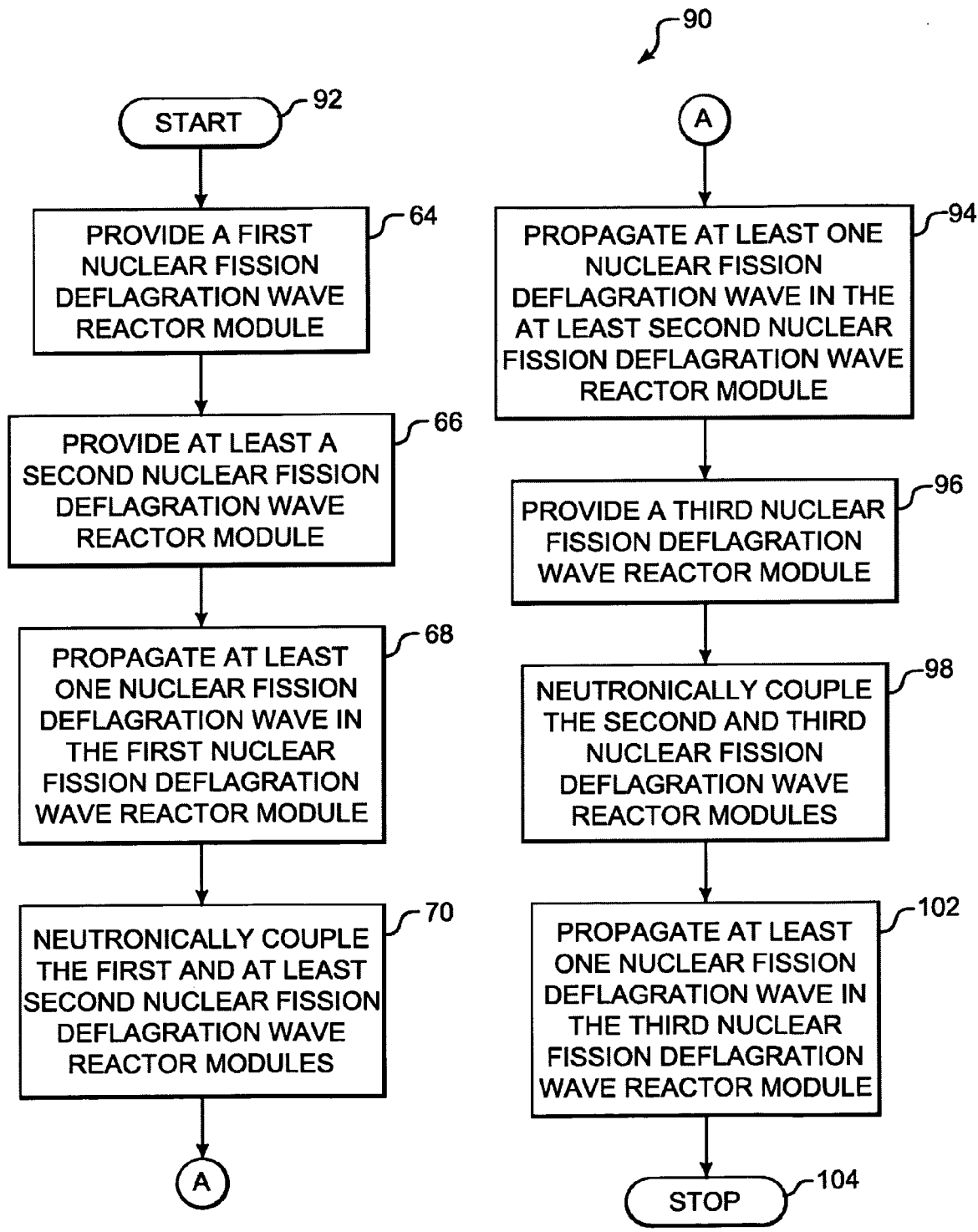

Referring now to FIG. 3D, a method 90 starts at a block 92. In the method 90, the blocks 64, 66, 68, and 70 are performed as described above in conjunction with FIG. 3A. After the first and at least second nuclear fission deflagration wave reactor modules are neutronically coupled at the block 70 (such as by initiating a nuclear fission deflagration wave in the at least second nuclear fission deflagration wave reactor module at the block 72 (FIG. 3B)), at least one nuclear fission deflagration wave is propagated in the at least second nuclear fission deflagration wave reactor module at a block 94.

At a block 96 a third nuclear fission deflagration wave reactor module is provided.

Figure 3E:
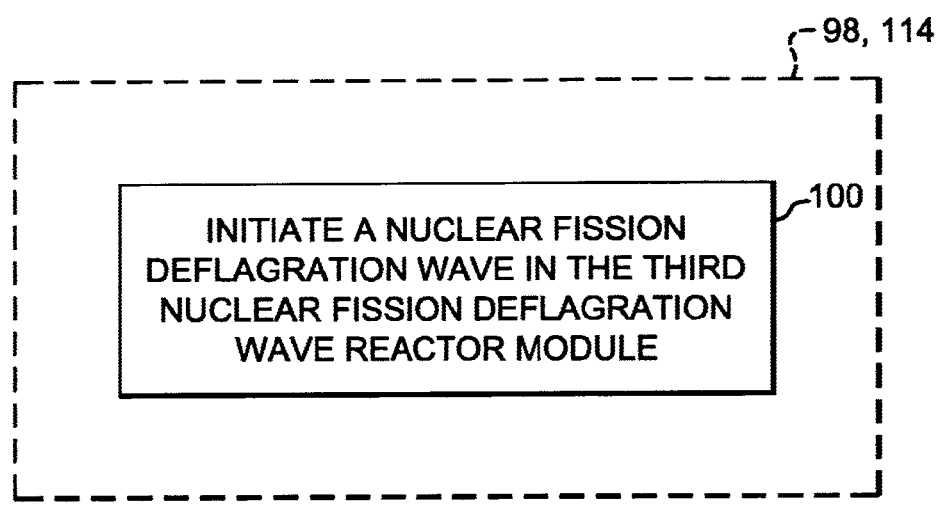

At a block 98 the second and third nuclear fission deflagration wave reactor modules are neutronically coupled. Referring additionally to FIG. 3E, the second and third nuclear fission deflagration wave reactor modules may be neutronically coupled at the block 98 by initiating a nuclear fission deflagration wave in the third nuclear fission deflagration wave reactor module at a block 100.

At a block 102 at least one nuclear fission deflagration wave is propagated in the third nuclear fission deflagration wave reactor module.

The method 90 stops at a block 104.

Figure 3F:
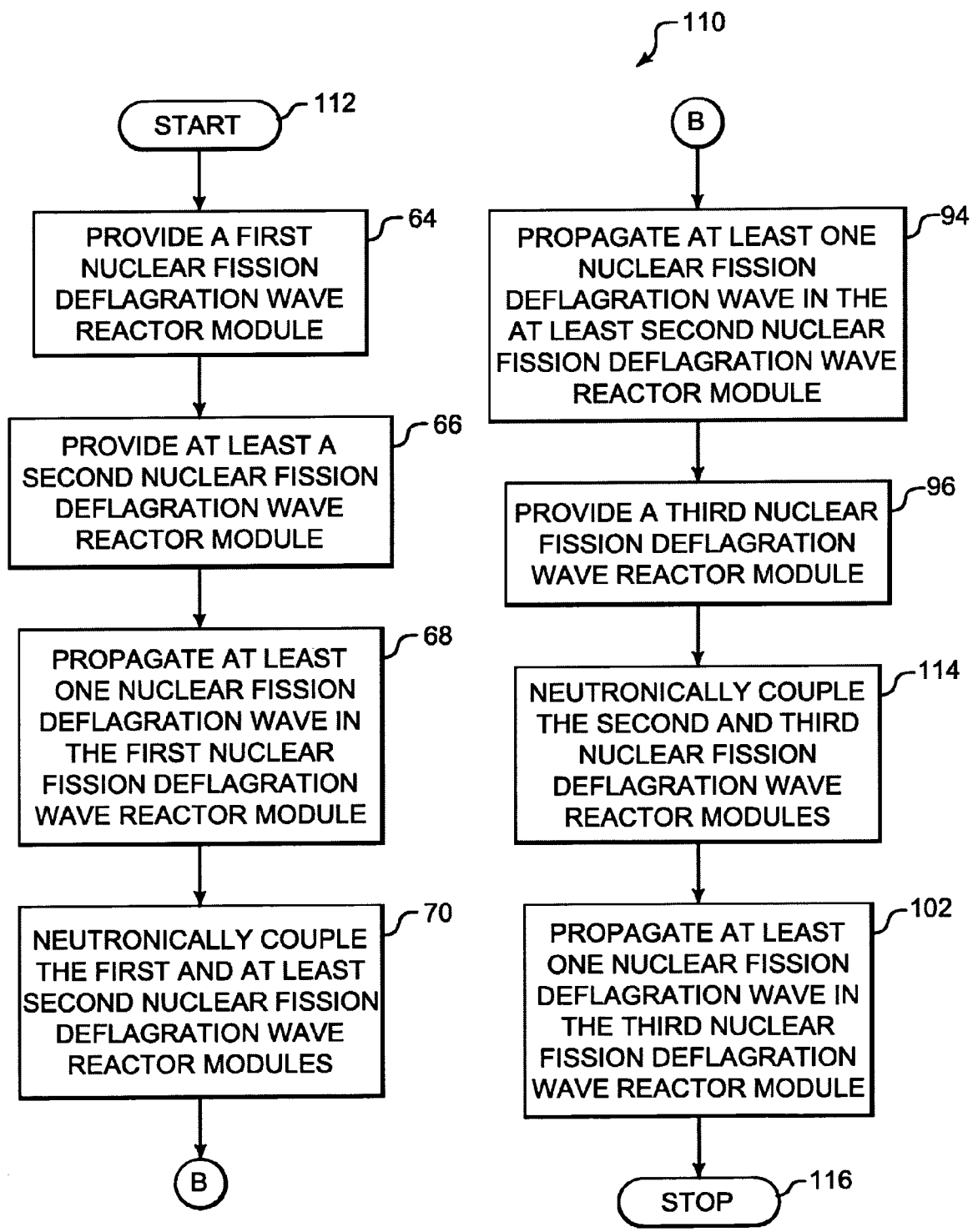

Referring now to FIG. 3F, a method 110 starts at a block 112. In the method 110, the blocks 64, 66, 68, and 70 are performed as described above in conjunction with FIG. 3A. After the first and at least second nuclear fission deflagration wave reactor modules are neutronically coupled at the block 70 (such as by initiating a nuclear fission deflagration wave in the at least second nuclear fission deflagration wave reactor module at the block 72 (FIG. 3B)), the blocks 94 and 96 are performed as described above in conjunction with FIG. 3D.

At a block 114 the first and third nuclear fission deflagration wave reactor modules are neutronically coupled. Referring additionally to FIG. 3E, the first and third nuclear fission deflagration wave reactor modules may be neutronically coupled at the block 114 by initiating a nuclear fission deflagration wave in the third nuclear fission deflagration wave reactor module as previously described for the block 100.

At the block 102 at least one nuclear fission deflagration wave is propagated in the third nuclear fission deflagration wave reactor module.

The method 110 stops at a block 116.

Figure 3G:
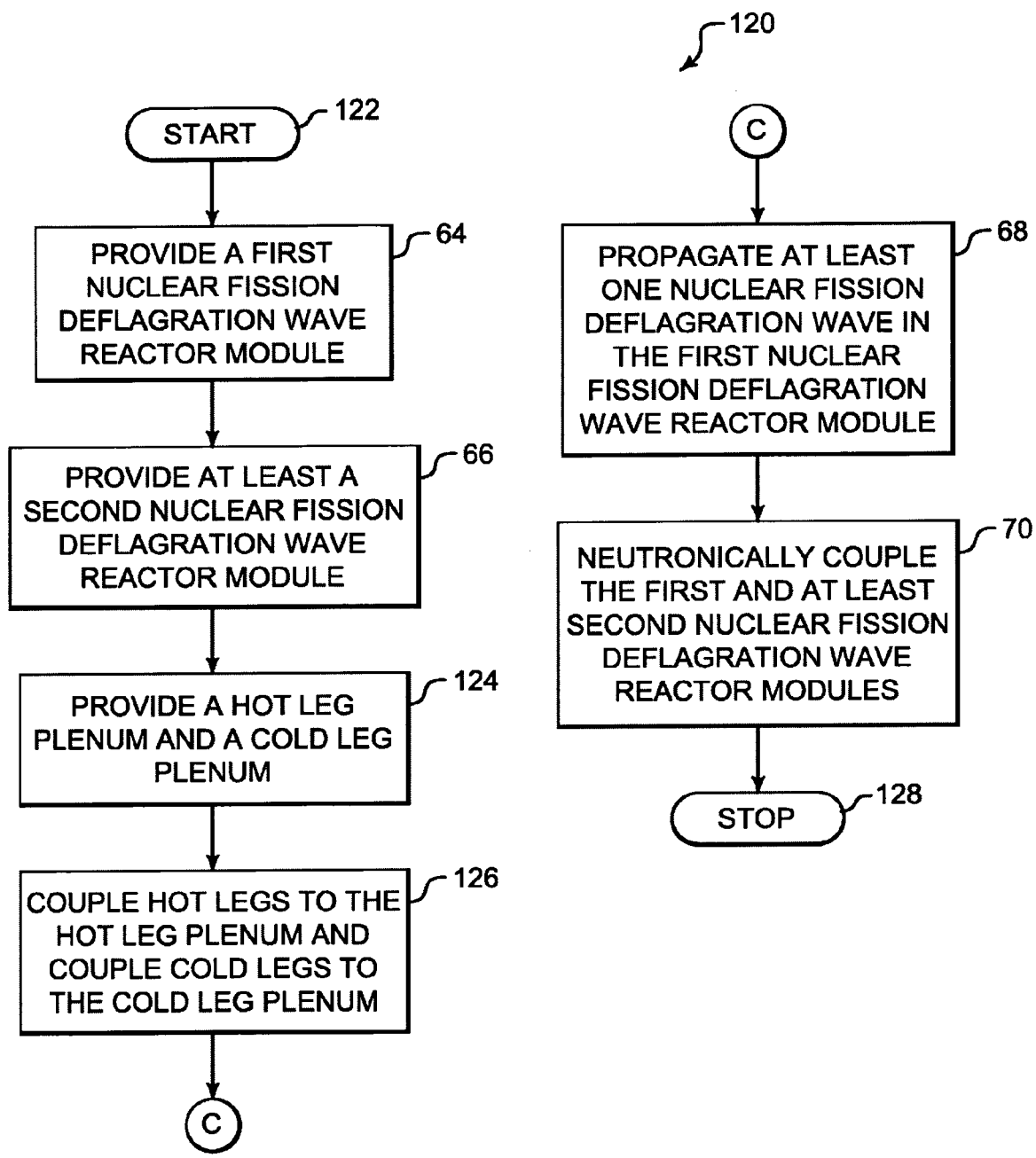

Referring now to FIG. 3G, a method 120 starts at a block 122. In the method 120, the blocks 64 and 66 are performed as described above in conjunction with FIG. 3A. In conjunction with the blocks 64 and 66, at a block 124 a hot leg plenum and a cold leg plenum are provided. No specific ordering of performance of the blocks 64, 66, and 124 is intended to be implied.

At a block 126 hot legs are coupled to the hot leg plenum and cold legs are coupled to the cold leg plenum.

After completion of the blocks 64, 66, 124, and 126, the blocks 68 and 70 are performed as described above in conjunction with FIG. 3A.

The method 120 stops at a block 128.

Figure 3H:
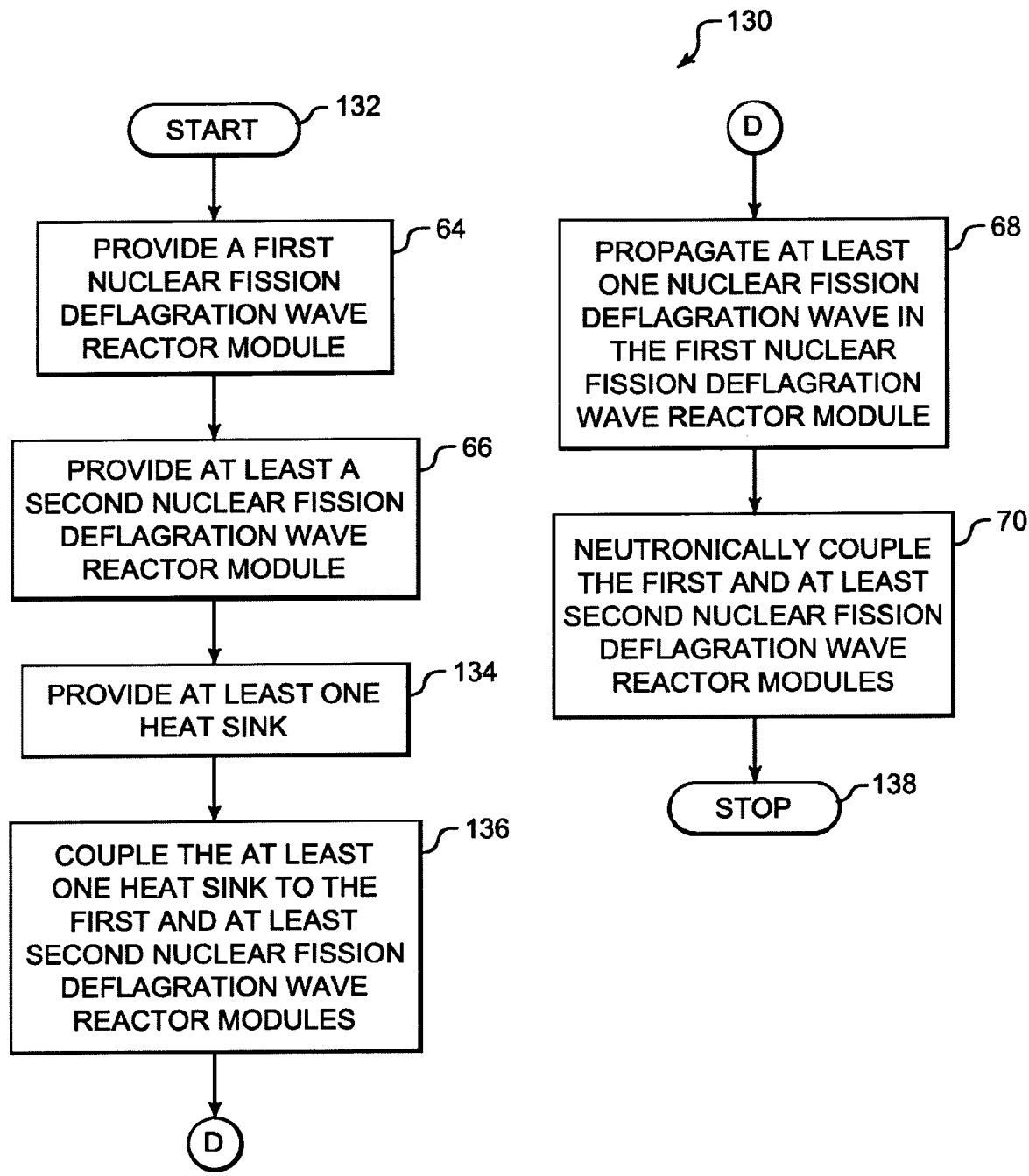

Referring now to FIG. 3H, a method 130 starts at a block 132. In the method 130, the blocks 64 and 66 are performed as described above in conjunction with FIG. 3A. In conjunction with the blocks 64 and 66, at a block 134 at least one heat sink is provided. No specific ordering of performance of the blocks 64, 66, and 134 is intended to be implied.

At a block 136 the at least one heat sink is coupled to the first and at least second nuclear fission deflagration wave reactor modules.

After completion of the blocks 64, 66, 134, and 136, the blocks 68 and 70 are performed as described above in conjunction with FIG. 3A.

The method 130 stops at a block 138.

Figure 3I:
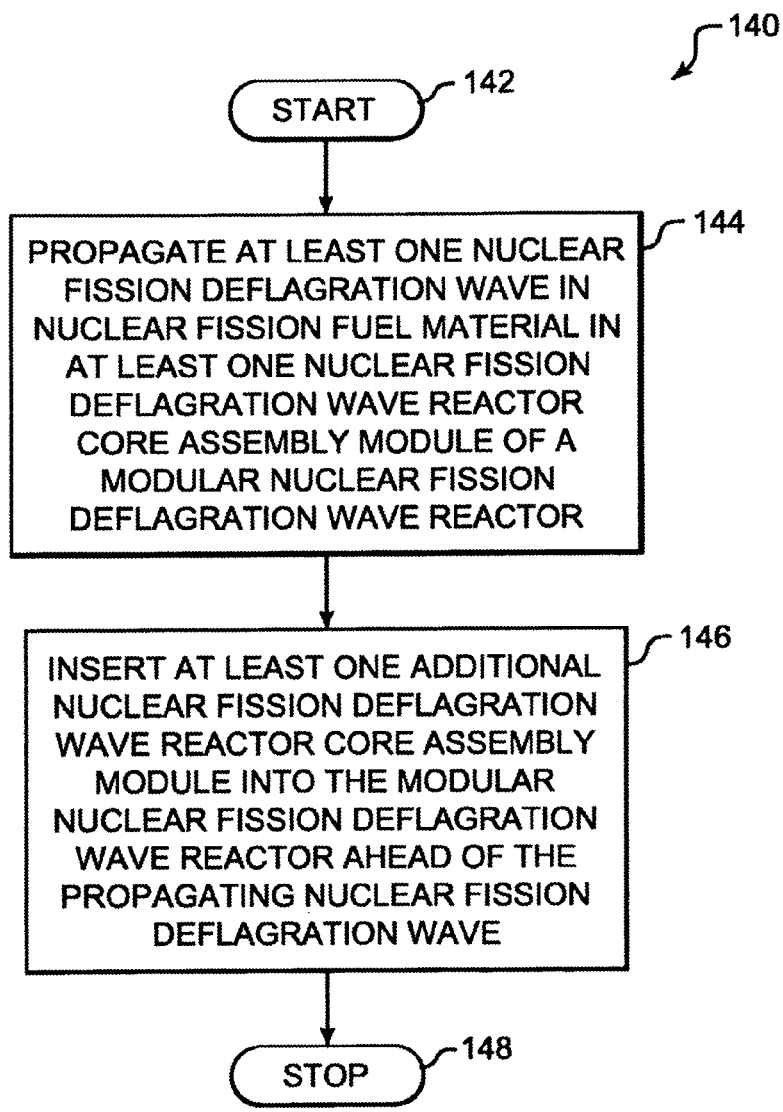

Referring now to FIG. 3I, a method 140 starts at a block 142. At a block 144, at least one nuclear fission deflagration wave is propagated in nuclear fission fuel material in at least one nuclear fission deflagration wave reactor core assembly module of a modular nuclear fission deflagration wave reactor.

At a block 146 at least one additional nuclear fission deflagration wave reactor core assembly module is inserted into the modular nuclear fission deflagration wave reactor ahead of the propagating nuclear fission deflagration wave.

The method 140 stops at a block 148.

Figure 3J:
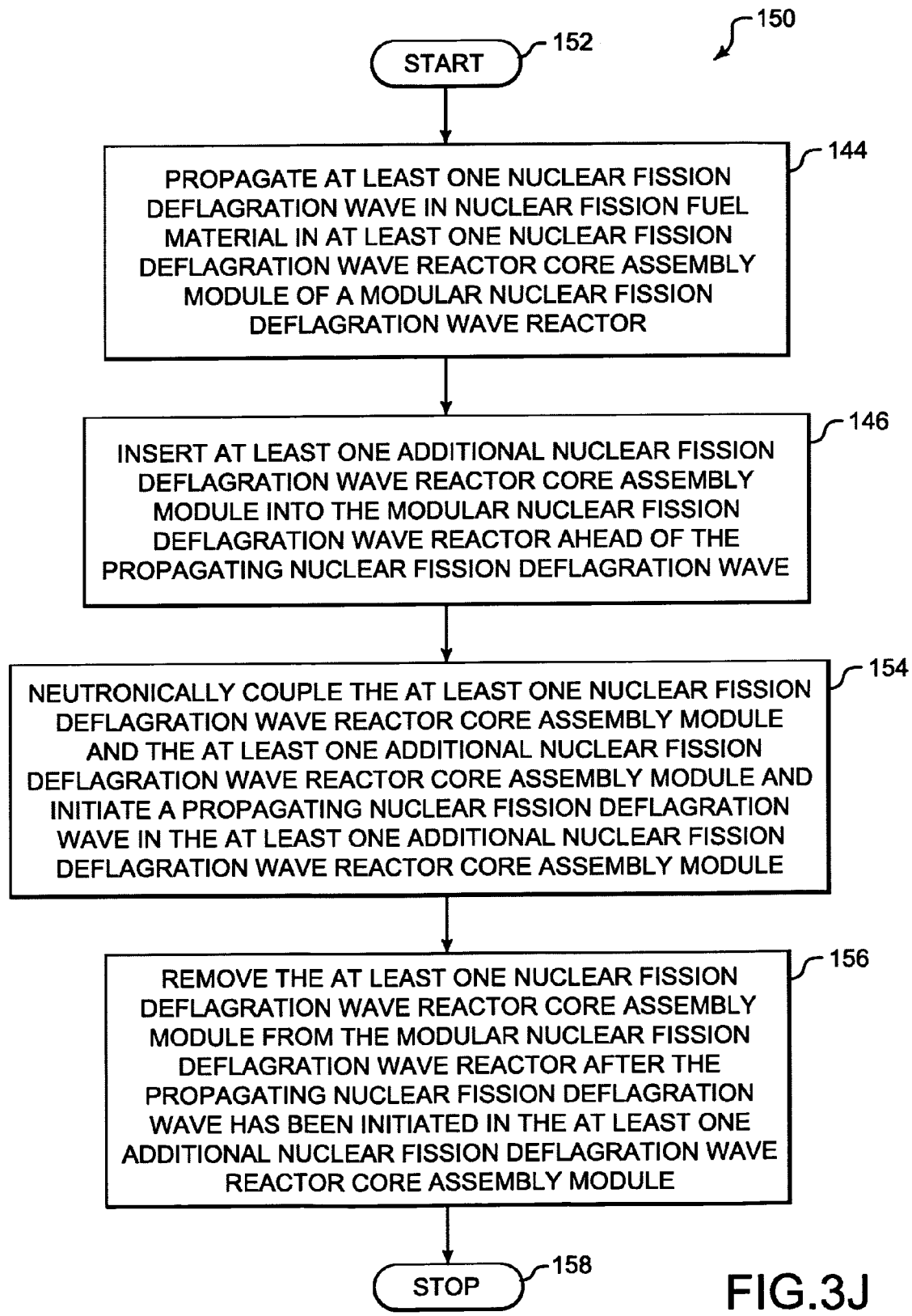

Referring now to FIG. 3J, a method 150 starts at a block 152. In the method 150, the blocks 144 and 146 are performed as described above in conjunction with FIG. 3I.

At a block 154 the at least one nuclear fission deflagration wave reactor core assembly module and the at least one additional nuclear fission deflagration wave reactor core assembly module can be neutronically coupled, and a propagating nuclear fission deflagration wave can be initiated in the at least one additional nuclear fission deflagration wave reactor core assembly module.

At a block 156 the at least one nuclear fission deflagration wave reactor core assembly module can be removed from the modular nuclear fission deflagration wave reactor after the propagating nuclear fission deflagration wave has been initiated in the at least one additional nuclear fission deflagration wave reactor core assembly module.

The method 150 stops at a block 158

One skilled in the art will recognize that the herein described components (e.g., blocks), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., blocks), devices, and objects herein should not be taken as indicating that limitation is desired.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A modular nuclear fission deflagration wave reactor module comprising:
    a nuclear fission deflagration wave reactor core assembly configured to propagate therein a nuclear fission deflagration wave;
    a reactor coolant system; and
    a reactor core housing, the nuclear fission deflagration wave reactor core assembly being disposed within the reactor core housing, the reactor core housing having:
        at least one portion distal the nuclear fission deflagration wave reactor core assembly and being made of a first material that is not neutronically translucent; and
        at least one-wall segment proximate the nuclear fission deflagration wave reactor core assembly, the at least one wall segment proximate the nuclear fission deflagration wave reactor core assembly being made of a second material that is different from the first material and that is neutronically translucent, the at least one-wall segment proximate the nuclear fission deflagration wave reactor core assembly being configured to propagate therethrough the nuclear fission deflagration wave.

2. The modular nuclear fission deflagration wave reactor module of claim 1, wherein the neutronically translucent material includes material chosen from metal, refractory metal, high-Z metal, ceramic, carbon, composite material, and stainless steel.

3. The modular nuclear fission deflagration wave reactor module of claim 1, wherein the reactor coolant system includes a forced circulation reactor coolant system.

4. The modular nuclear fission deflagration wave reactor module of claim 1, wherein the nuclear fission deflagration wave reactor core assembly includes a fast spectrum nuclear fission breeder reactor core assembly.

5. The modular nuclear fission deflagration wave reactor module of claim 1, wherein the nuclear fission deflagration wave reactor core assembly has three characteristic dimensions each of which is not substantially less than one mean free path for fission inducing neutrons.

6. The modular nuclear fission deflagration wave reactor module of claim 1, wherein the nuclear fission deflagration wave reactor core assembly includes nuclear fission fuel material that is inherently subcritical.

7. The modular nuclear fission deflagration wave reactor module of claim 1, wherein the nuclear fission deflagration wave reactor core assembly includes a plurality of coolant channels.

8. The modular nuclear fission deflagration wave reactor module of claim 7, further comprising:
    an inlet plenum coupled to inlets of the coolant channels; and
    an outlet plenum coupled to outlets of the coolant channels.

9. The modular nuclear fission deflagration wave reactor module of claim 8, further comprising:
    cold leg piping coupled to the inlet plenum; and
    hot leg piping coupled to the outlet plenum.

10. The modular nuclear fission deflagration wave reactor module of claim 1, wherein the nuclear fission deflagration wave reactor core assembly includes fertile nuclear fission fuel material.

11. The modular nuclear fission deflagration wave reactor module of claim 10, wherein the fertile nuclear fission fuel material includes material chosen from $^{238}$U and $^{232}$Th.

* * * * *